(12) United States Patent
Long et al.

(10) Patent No.: US 9,283,648 B2
(45) Date of Patent: Mar. 15, 2016

(54) METHODS OF POLISHING SAPPHIRE SURFACES

(71) Applicant: ECOLAB USA INC., Naperville, IL (US)

(72) Inventors: Kim Marie Long, Naperville, IL (US); Michael Kamrath, Aurora, IL (US); Sean McCue, Chicago, IL (US)

(73) Assignee: ECOLAB USA Inc., St. Paul, MN (US)

( * ) Notice: Subject to any disclaimer, the term of this patent is extended or adjusted under 35 U.S.C. 154(b) by 106 days.

(21) Appl. No.: 13/974,356

(22) Filed: Aug. 23, 2013

(65) Prior Publication Data

US 2014/0057533 A1 Feb. 27, 2014

Related U.S. Application Data

(60) Provisional application No. 61/692,974, filed on Aug. 24, 2012.

(51) Int. Cl.
| | |
|---|---|
| *B24B 1/00* | (2006.01) |
| *B24B 37/04* | (2012.01) |
| *B24B 7/22* | (2006.01) |
| *C09G 1/02* | (2006.01) |

(52) U.S. Cl.
CPC .............. *B24B 37/044* (2013.01); *B24B 7/228* (2013.01); *C09G 1/02* (2013.01)

(58) Field of Classification Search
CPC .......... B24B 7/22; B24B 7/228; B24B 7/241; B24B 37/24; B24B 37/044; C01B 33/141; C03C 19/00; C09G 1/02; C09K 3/1454; C09K 3/1463
See application file for complete search history.

(56) References Cited

U.S. PATENT DOCUMENTS

| | | | |
|---|---|---|---|
| 5,228,886 A * | 7/1993 | Zipperian | 51/293 |
| 5,407,526 A | 4/1995 | Danielson et al. | |
| 6,517,426 B2 * | 2/2003 | Lee | 451/537 |
| 6,719,819 B2 | 4/2004 | Ota et al. | |
| 6,786,945 B2 * | 9/2004 | Machii et al. | 51/307 |
| 6,910,952 B2 | 6/2005 | Suenaga et al. | |
| 7,695,347 B2 | 4/2010 | Masumura et al. | |
| 8,052,788 B2 | 11/2011 | MacDonald | |
| 8,702,472 B2 | 4/2014 | Morinaga et al. | |
| 8,721,917 B2 * | 5/2014 | Cherian et al. | 252/79.1 |
| 2004/0132306 A1 * | 7/2004 | Bellman et al. | 438/690 |
| 2005/0050803 A1 | 3/2005 | Amanokura et al. | |
| 2005/0227591 A1 * | 10/2005 | Enomoto et al. | 451/41 |

(Continued)

FOREIGN PATENT DOCUMENTS

| | | |
|---|---|---|
| JP | 2008-044078 A | 2/2008 |
| JP | 2008044078 | 2/2008 |

(Continued)

OTHER PUBLICATIONS

International Search Report and Written Opinion for International Application No. PCT/US2013/056482 dated Nov. 6, 2013 (14 pages).

(Continued)

*Primary Examiner* — Timothy V Eley
(74) *Attorney, Agent, or Firm* — Eric D. Babych; Brinks Gilson & Lione

(57) ABSTRACT

Described herein are methods for polishing sapphire surfaces using compositions comprising colloidal silica, wherein the colloidal silica has a broad particle size distribution.

18 Claims, 18 Drawing Sheets

(56) References Cited

U.S. PATENT DOCUMENTS

| | | |
|---|---|---|
| 2005/0234136 A1 | 10/2005 | Holland et al. |
| 2006/0196849 A1 | 9/2006 | Moeggenborg et al. |
| 2007/0116423 A1* | 5/2007 | Leatherdale et al. ......... 385/146 |
| 2008/0057716 A1 | 3/2008 | Yamashita |
| 2008/0283502 A1 | 11/2008 | Moeggenborg et al. |
| 2009/0018219 A1 | 1/2009 | MacDonald |
| 2009/0098807 A1* | 4/2009 | Bakshi et al. .................. 451/36 |
| 2009/0104851 A1 | 4/2009 | Cherian et al. |
| 2009/0314744 A1 | 12/2009 | Vacassy et al. |
| 2011/0223840 A1* | 9/2011 | Morinaga et al. ............... 451/28 |
| 2012/0129346 A1* | 5/2012 | Ryuzaki et al. ............... 438/693 |
| 2012/0270400 A1 | 10/2012 | Takegoshi et al. |
| 2013/0037515 A1* | 2/2013 | Hosoi et al. .................... 216/53 |
| 2013/0115859 A1* | 5/2013 | Choi et al. ..................... 451/36 |
| 2013/0130595 A1* | 5/2013 | Yoshida .......................... 451/36 |
| 2014/0001153 A1* | 1/2014 | Matsuyama et al. ........... 216/38 |
| 2014/0057532 A1* | 2/2014 | Long et al. ...................... 451/41 |
| 2014/0057533 A1 | 2/2014 | Long et al. |
| 2014/0263170 A1* | 9/2014 | Long et al. ...................... 216/38 |
| 2014/0335308 A1* | 11/2014 | Tanikella et al. ............. 428/141 |

FOREIGN PATENT DOCUMENTS

| | | |
|---|---|---|
| JP | 2009-297818 A | 12/2009 |
| JP | 2009297818 | 12/2009 |
| JP | 2011-162402 | 8/2011 |
| TW | I287484 | 3/1995 |

OTHER PUBLICATIONS

International Search Report, PCT/US2013/056482, Feb. 24, 2015 (10 pgs).
International Search Report and Written Opinion, PCT/US2013/056482, Nov. 6, 2013, (12 pgs.).
International Search Report and Written Opinion, PCT/US2014/024455, Jul. 21, 2014 (14 pgs.).

* cited by examiner

A.

B.

METHODS OF POLISHING SAPPHIRE SURFACES

CROSS-REFERENCE TO RELATED APPLICATIONS

This is a non-provisional of U.S. Provisional Patent Appl. No. 61/692,974, filed on Aug. 24, 2012, the contents of which are incorporated fully herein by reference.

FIELD OF THE INVENTION

The present invention relates to compositions, kits and methods for polishing sapphire surfaces using polishing compositions comprising colloidal silica, wherein the colloidal silica has a broad particle size distribution.

BACKGROUND OF THE INVENTION

Sapphire is a generic term for alumina ($Al_2O_3$) single-crystal materials. Sapphire is a particularly useful material for use as windows for infrared and microwave systems, optical transmission windows for ultraviolet to near infrared light, light emitting diodes, ruby lasers, laser diodes, support materials for microelectronic integrated circuit applications and growth of superconducting compounds and gallium nitride, and the like. Sapphire has excellent chemical stability, optical transparency and desirable mechanical properties, such as chip resistance, durability, scratch resistance, radiation resistance, a good match for the coefficient of thermal expansion of gallium arsenide, and flexural strength at elevated temperatures.

Sapphire wafers are commonly cut along a number of crystallographic axes, such as the C-plane (0001 orientation, also called the 0-degree plane or the basal plane), the A-plane (1120 orientation, also referred to as 90 degree sapphire) and the R-plane (1102 orientation, 57.6 degrees from the C-plane). R-plane sapphire, which is particularly suitable for silicon-on-sapphire materials used in semiconductor, microwave and pressure transducer applications, is more resistant to polishing than C-plane sapphire, which is typically used in optical systems, infrared detectors, and growth of gallium nitride for light-emitting diode applications.

The polishing and cutting of sapphire wafers can be an extremely slow and laborious process. Often, aggressive abrasives, such as diamond, must be used to achieve acceptable polishing rates. Such aggressive abrasive materials can impart serious sub-surface and surface damage and contamination to the wafer surface. Typical sapphire polishing involves continuously applying a slurry of abrasive to the surface of the sapphire wafer to be polished, and simultaneously polishing the resulting abrasive-coated surface with a rotating polishing pad, which is moved across the surface of the wafer, and held against the wafer surface by a constant down-force, typically in the range of about 5 to 20 pounds per square inch (psi). The interaction of sapphire and colloidal silica under the temperature and pressure of polishing pads leads to an energetically favorable chemical reaction for the formation of aluminum silicate dehydrate species (i.e., $Al_2O_3 + 2SiO_2 \rightarrow Al_2Si_2O_2 \cdot 2H_2O$). The hardness of these various hydrates and aluminum species are assumed to be lower than the underlying sapphire, resulting in a slight film, which can be easily removed by colloidal silica slurries without damaging the underlying surfaces. Prior practices have also focused on increasing polishing temperatures to increase the rate of alumina hydrate film formation and thus the removal rate. It has also been shown that increasing salt concentrations in basic colloidal silica slurries have increased removal rates for both c and m plane sapphire. Finally adding aluminum chelating agents, such as EDTA derivatives and ether-alcohol surfactants enhances polishing performance by tying up and lifting off the surface alumina species and suspending the slurry components for a cleaner wafer surface.

None of these developments in sapphire polishing however have completely resolved polishing performance due to the typically slow polishing rates achievable with other abrasive materials and lack of consensus regarding the impact of particle size and distribution in combination with polishing pad properties. Accordingly, there is an ongoing need for compositions, kits and methods to enhance the efficiency of polishing of sapphire surfaces.

SUMMARY OF INVENTION

The present invention is directed a method of polishing a sapphire surface, comprising abrading a sapphire surface with a rotating polishing pad and a polishing composition, wherein the polishing composition comprises an effective amount of colloidal silica, and wherein the colloidal silica has a broad particle size distribution. In some embodiments, the colloidal silica of the method comprises about 1 wt. % to about 50 wt. % of the polishing composition and has a particle size distribution of about 5 nm to about 120 nm. In some embodiments, the ratio of the standard deviation of the particle size of the colloidal silica ($\sigma$), to the mean particle size of the colloidal silica (r), is at least about 0.3 to about 0.9. In some embodiments, the colloidal silica composition has a mean particle size of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm and each size is 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, or 25.0% of the total mass of the colloidal silica particles used in the polishing composition.

In some embodiments, the polishing composition further comprises an additional component selected from the group consisting of an alkaline substance, inorganic polishing particles a water-soluble alcohol, a chelating agent and a buffering agent. In some embodiments, the pH of the polishing composition is about 6 to about 10.5. In some embodiments, the polishing pad is applied to the sapphire surface with a downforce of about 5 psi to about 25 psi and is rotated at a rate of about 40 rpm to about 120 rpm. In some embodiments, the polishing pad comprises a polyurethane impregnated polyester material and has a compressibility of about 1% to about 40%. In some embodiments, the polishing pad may have a Shore D hardness of about 50 to about 60. In some embodiments, the sapphire surface is a sapphire C-plane surface or a sapphire R-plane surface.

In some embodiments, the colloidal silica used in the method may be prepared by a process comprising (a) feeding a first component including preformed silica sol particles of predetermined minimum particle size to at least one agitated, heated reactor; (b) adding a second component including silicic acid to said reactor, wherein the second component is fed to the reactor at a rate that is less than a new silica particle nucleation rate; (c) adding a third component including an alkaline agent to the reactor; and (d) wherein the minimum particle size of the resulting colloidal silica is controlled by the particle size of the first component, and wherein the broad particle size distribution is dependent on the ratio of the feed rates of the first component to the second component. In some embodiments, the colloidal silica is prepared by a process comprising blending two or more colloidal silica compositions, wherein the colloidal silica compositions have an average particle size of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 nm.

The present invention is further directed to a kit for polishing a sapphire surface, the kit comprising (a) a polishing composition comprising colloidal silica having a particle size distribution of about 10 nm to about 120 nm, and (b) a polishing pad comprising polyurethane impregnated with polyester, having a compressibility about 5% to about 10% and a Shore D hardness of about 50 to about 60.

DETAILED DESCRIPTION

Figure 1:
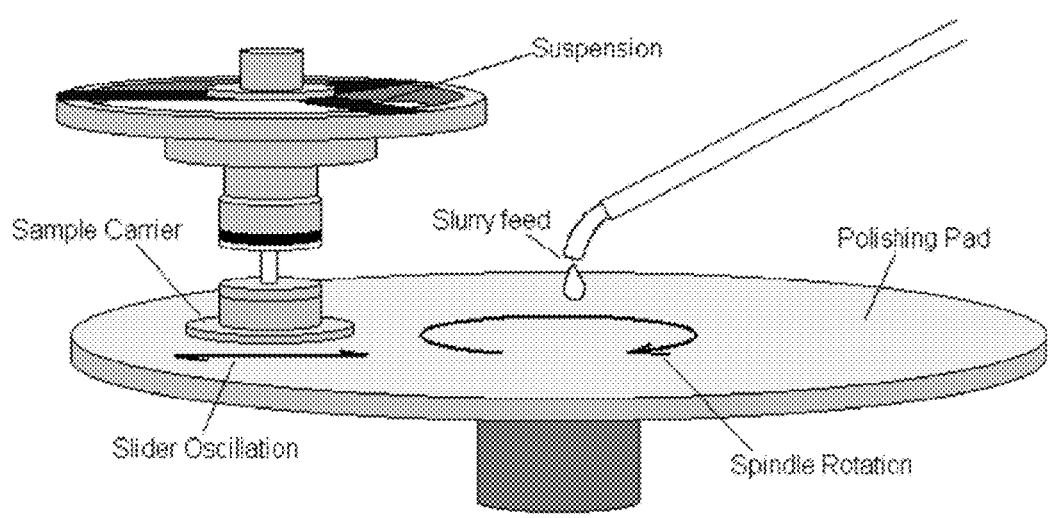
FIG. 1 is an illustration of a polishing system.

The present invention is directed to the discovery of unique pad-particle interactions between colloidal silica compositions having broad or multimodal particle size distributions, with different polishing pads. Such interactions may result in effective and efficient polishing of sapphire surfaces. The compositions having broad, well-defined particle size distributions of colloidal silica particles may enhance the chemical mechanical planarization of sapphire surfaces, with increased material removal rates and concurrent reduced surface roughness of the sapphire substrate.

The present invention is directed to compositions, kits and methods for polishing sapphire surfaces, such as C-plane or R-plane wafers. The compositions comprise colloidal silica particles in an aqueous matrix, where the particle size distribution is broad but well-defined, ranging from about 5 nm to about 120 nm. The particle size distribution may be characterized by the ratio of the standard deviation of the particle size distribution (σ) to the mean particle size (r), wherein the σ/r value is at least about 0.3. The distribution of particles can be obtained through blending of specified particle sizes in defined ratios, or by an engineered continuous manufacturing process.

The methods of the present invention may provide material removal rates for polishing sapphire surfaces that are higher than removal rates achievable with conventional abrasive slurries that have narrow particle size distributions. The resulting polished sapphire substrates may be used in a number of applications, including, but not limited to, light-emitting diodes (LEDs), semiconductors, optical lasers and telecommunication devices.

1. DEFINITIONS

The terminology used herein is for the purpose of describing particular embodiments only and is not intended to be limiting. As used in the specification and the appended claims, the singular forms "a," "and" and "the" include plural references unless the context clearly dictates otherwise.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

"Asker C" hardness means a measurement of the hardness of soft rubber and sponge, as measured by an Asker C hardness tester.

"Colloidal silica composition" and other like terms including "colloidal," "sol," and the like refer to an aqueous two-phase system having a dispersed phase and a continuous phase. The colloidal silica compositions used in the present invention have a solid phase dispersed or suspended in a continuous or substantially continuous liquid phase, typically an aqueous solution. Thus, the term "colloid" or "silica sol" encompasses both phases, whereas "colloidal particles," "colloidal silica," "silica sol particles" or "particles" refers to the dispersed or solid phase.

"Material Removal Rate" or "MRR" refers to the amount of the material removed divided by the time interval. The MRR may be reported in mass per unit time (e.g., mg/min), or in units of nm/min for a given substrate. For example, the density of sapphire is 3.98 g/cm$^3$, an thus 0.001 gram loss is equivalent to a 55.1 nm uniform loss across the surface of the 3 inch (7.62 cm) wafer. Therefore, material removal rate can be calculated by the following conversion equation:

$$\text{Material Removal rate (nm/min)} = \frac{\text{wt loss (g)} \times 1000 \text{ mg/g} \times 55.1 \text{ nm/mg}}{\text{polishing time (min)}}$$

"Polishing composition" as used herein refers to a composition that includes a colloidal silica composition and optional additional components, which may be used for polishing a sapphire surface. The polishing composition may include colloidal silica as a dispersed phase, an aqueous solution as a continuous phase, and optionally additional components selected from alkaline substances, other inorganic polishing particles, water-soluble alcohols, chelating agents, buffering agent, surfactants, emulsifying agents, viscosity modifiers, wetting agents, lubricants, soaps, and the like.

"Root-mean square roughness," "RMS roughness" or "$R_q$" are used interchangeably herein and refer to the standard deviation of the Z values within a given area, and is represented by Equation 1:

$$R_q = \left( \sum_{i=1}^{N} (Z_i - Z_{avg})^2 / N \right)^{1/2} \quad \text{Eq. 1.}$$

where $Z_{avg}$ is the average Z value within the given area, $Z_i$ is the Z value of interest (point or pixel), and N is the number of points within a given area. Thus, a perfectly flat surface would have $R_q=0$. A nonzero but low $R_q$ would indicate that although the surface may be rough, the features contributing to the roughness are all approximately equal. A high $R_q$ on the other hand would indicate a high degree of variability between features.

"Roughness average," "mean roughness" or "$R_a$" are used interchangeably herein and refer to the arithmetic average of the deviations from the center plane and is represented by Equation 2:

$$R_a = \sum_{i=1}^{N} |Z_i - Z_{cp}| / N \quad \text{Eq. 2.}$$

where $Z_{cp}$ is the Z value of the center plane, $Z_i$ is again the Z value of interest, and N is the number of points in a given area.

"Shore C hardness" is a measurement of the hardness of hard rubbers, semi-rigid plastics and hard plastics, as measured by a Shore durometer. The different Shore Hardness scales measure the resistance of a material to indentation by a needle under a defined spring force.

"Shore D hardness" is a measurement of the hardness of hard rubbers, semi-rigid plastics and hard plastics, as measured by a Shore durometer. The different Shore Hardness scales measure the resistance of a material to indentation by a needle under a defined spring force.

"Stable" means that the solid phase of the colloid is present, dispersed through the medium and stable throughout this entire pH range with effectively no precipitate.

The "Z-value" is a measurement of the vertical height at a given point on a surface, as determined by Atomic Force Microscopy. The "Z-range" is the difference in height between the maximum and minimum features in an image area.

2. COMPOSITIONS AND KITS FOR POLISHING SAPPHIRE SURFACES

Described herein are polishing compositions and kits comprising the polishing compositions, wherein the polishing composition comprises colloidal silica particles having a broad particle size distribution. The kits further comprise a polishing pad for polishing a sapphire surface. The kit may be used to abrade a sapphire surface with the polishing pad and the polishing composition. The kit may be used to produce material removal rates (MRRs) greater than or comparable to those achieved using colloidal silica polishing compositions having unimodal, tight particle size distributions (PSD). The kit may allow for use of lower concentrations of the polishing composition without loss in MRR. The kit may also further comprise instructions for polishing sapphire surfaces.

The kit may improve final surface roughness of a sapphire surface by providing a material removal rate (MRR) of at least about 30 nm/minute, 31 nm/minute, 32 nm/minute, 33 nm/minute, 34 nm/minute, 35 nm/minute, 36 nm/minute, 37 nm/minute, 38 nm/minute, 39 nm/minute, 40 nm/minute, 41 nm/minute, 42 nm/minute, 43 nm/minute, 44 nm/minute, 45 nm/minute, 46 nm/minute, 47 nm/minute, 48 nm/minute, 49 nm/minute, 50 nm/minute, 51 nm/minute, 52 nm/minute, 53 nm/minute, 54 nm/minute, 55 nm/minute, 56 nm/minute, 57 nm/minute, 58 nm/minute, 59 nm/minute, 60 nm/minute, 61 nm/minute, 62 nm/minute, 63 nm/minute, 64 nm/minute, 65 nm/minute, 66 nm/minute, 67 nm/minute, 68 nm/minute, 69 nm/minute, or 70 nm/minute, depending upon the pounds per square inch (PSI) pressure and the pad used on the sapphire surface. The kit may achieve a material removal rate (MRR) from the sapphire surface of 40.0 nm/minute, 40.5 nm/minute, 41.0 nm/minute, 41.5 nm/minute, 42.0 nm/minute, 42.5 nm/minute, 43.0 nm/minute, 43.5 nm/minute, 44.0 nm/minute, 44.5 nm/minute, 45.0 nm/minute, 45.5 nm/minute, 46.0 nm/minute, 46.5 nm/minute, 47.0 nm/minute, 47.5 nm/minute, 48.0 nm/minute, 48.5 nm/minute, 49.0 nm/minute, 49.5 nm/minute, 50.0 nm/minute, 50.5 nm/minute, 51.0 nm/minute, 51.5 nm/minute, 52.0 nm/minute, 52.5 nm/minute, 53.0 nm/minute, 53.5 nm/minute, 54.0 nm/minute, 54.5 nm/minute, 55.0 nm/minute, 55.5 nm/minute, 56.0 nm/minute, 56.5 nm/minute, 57.0 nm/minute, 57.5 nm/minute, 58.0 nm/minute or 58.5 nm/minute removal rate from a sapphire surface.

The kit may provide a root mean square (RMS) roughness, or $R_q$, of a sapphire surface of less than or equal to 2.0 nm, 1.9 nm, 1.8 nm, 1.7 nm, 1.6 nm, 1.5 nm, 1.4 nm, 1.3 nm, 1.2 nm, 1.1 nm, 1.0 nm, 0.9 nm, 0.80 nm, 0.70 nm, 0.60 nm, 0.50 nm, 0.40 nm, 0.30 nm, 0.20 nm or 0.10 nm, from an initial RMS of up to 1 micron after polishing the sapphire surface for a period of time (e.g., about 180 minutes). The kit may achieve a RMS roughness of a sapphire surface of less than or equal to 5.0 Å, 4.9 Å, 4.8 Å, 4.7 Å, 4.6 Å, 4.5 Å, 4.4 Å, 4.3 Å, 4.2 Å, 4.1 Å, 4.0 Å, 3.9 Å, 3.8 Å, 3.7 Å, 3.6 Å, 3.5 Å, 3.4 Å, 3.3 Å, 3.2 Å, 3.1 Å, 3.0 Å, 2.9 Å, 2.8 Å, 2.7 Å, 2.6 Å, 2.5 Å, 2.4 Å, 2.3 Å, 2.2 Å, 2.1 Å, 2.0 Å, 1.9 Å, 1.8 Å, 1.7 Å, 1.6 Å, or 1.5 Å after polishing of the sapphire surface for a period of time (e.g., about 180 minutes)

The kit may provide a roughness average, or $R_a$, of a sapphire surface of equal to or less than 1.8 nm, 1.7 nm, 1.6 nm, 1.5 nm, 1.4 nm, 1.3 nm, 1.2 nm, 1.1 nm, 1.0 nm, 0.9 nm, 0.80 nm, 0.70 nm, 0.60 nm, 0.50 nm, 0.40 nm, 0.30 nm or 0.20 nm after polishing of the sapphire surface for a period of time (e.g., about 180 minutes). The kit may achieve a roughness average of a sapphire surface of 14.5 Å, 4.4 Å, 4.3 Å, 4.2 Å, 4.1 Å, 4.0 Å, 3.9 Å, 3.8 Å, 3.7 Å, 3.6 Å, 3.5 Å, 3.4 Å, 3.3 Å, 3.2 Å, 3.1 Å, 3.0 Å, 2.9 Å, 2.8 Å, 2.7 Å, 2.6 Å, 2.5 Å, 2.4 Å, 2.3 Å, 2.2 Å, 2.1 Å, 2.0 Å, 1.9 Å, 1.8 Å, 1.7 Å, 1.6 Å, or 1.5 Å after polishing of the sapphire surface for a period of time (e.g., about 180 minutes).

The kit may also allow for effective polishing of a sapphire surface without significant increases in temperature during the polishing process. For example, the temperature may increase by less than 1, 2, 3, 4, 5, 6, 7, 8, 9 or 10° C. from the set temperature during the polishing.

Effective polishing of a sapphire surface can be further enhanced by elevating and controlling the temperature of the slurry and polishing platen to maintain temperatures above ambient temperature. For example, the polishing pad temperature may be targeted at 25° C. to 50° C.+/−3° C. during the polishing.

a. Polishing Compositions

The kit for polishing a sapphire surface comprises a polishing composition. The polishing composition comprises colloidal silica particles having a broad particle size distribution. The polishing composition may be an aqueous slurry of colloidal silica particles in water (e.g., deionized water), with optional additional components.

i. Colloidal Silica

The colloidal silica may be a suspension of fine amorphous, nonporous, and typically spherical silica ($SiO_2$) particles in a liquid phase. The colloidal silica particles may have a particle size distribution of about 5 nm to about 120 nm. The colloidal silica particles may have a particle diameter of 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 105 nm, 110 nm, 115 nm, and 120 nm with each colloid silica particle size represents 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, or 25.0% of the total mass of the colloidal silica particles used in the polishing composition.

In embodiments, the particle size distribution of colloidal silica compositions can be defined by the ratio of the standard deviation of the distribution, $\sigma$, to the average particle diameter, r, as determined using transmission electron microscopy (TEM). Such a convention is described in U.S. Pat. No. 6,910,952. Colloidal silica compositions that may be used in the methods and kits described herein may have a may have a broad particle size distribution, with values of $\sigma/r$ of at least about 0.30 to about 0.90, e.g., about 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.7, 0.73, 0.74, 0.75, 0.76, 0.77. 0.78, 0.79, 0.80, 0.81, 0.82, 0.83, m 0.84, 0.85, 0.86, 0.87, 0.88, 0.89 or 0.90.

The colloidal silica particles may have a mean particle diameter, r, of about 10 nm to about 50 nm, e.g., about 20 nm to about 40 nm. For example, the colloidal silica particles may have a mean particle size of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm.

The standard deviation of the particle size distribution of the colloidal silica particles, 6, of about 10 to about 20, e.g., 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.1, 16.2, 16.3, 16.4, 16.5, 16.6, 16.7, 16.8, 16.9, 17, 17.1, 17.2, 17.3, 17.4, 17.5, 17.6, 17.7, 17.8, 17.9, 18, 18.1, 18.2, 18.3, 18.4, 18.5, 18.6, 18.7, 18.8, 18.9, 19, 19.1, 19.2, 19.3, 19.4, 19.5, 19.6, 19.7, 19.8, 19.9 or 20.

The percent of total mass of each colloidal silica particle at a particular size may vary greatly, but a broad distribution of sizes is present. For example, the colloidal silica composition may have a mean particle size of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm, and particles of each size may be 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, or 20.0% of the total mass of the colloidal silica particles used in the polishing composition.

ii. Liquid Phase

The polishing composition further comprises a liquid phase in order to generate a slurry. For example, the liquid phase may be deionized water. Either prior to or following formation of the slurry of colloidal silica in the liquid phase, the pH may be adjusted to about 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4 or 10.5. The pH may be adjusted using a base such as sodium hydroxide, potassium hydroxide, or the like.

iii. Optional Additional Components

In embodiments, the polishing composition may further include one or more of the following additives:

A) Alkaline substances, such as sodium hydroxide, quaternary ammonium bases and its salt, water soluble amines such as monoethanolamine, alkali metal salts including nitrates, chlorides, sulfates and the like.

B) Inorganic polishing particles such as non-oxide sols, including diamond, boron nitride, silicon nitride, silicon carbide, etc. Similarly, alumina, zirconia, zirconium silicate, mullite, cerium oxide, iron oxide, chromium oxide, titanium oxide, tin oxide and the like can be added. Similarly, the composition may contain hydrated oxides such as aluminum hydroxide, boehmite, or goethite.

C) Water-soluble alcohols such as ethanol, propanol, ethylene glycol, propylene glycol, and the like.

D) Chelating agents, for example, one or more amine or amide containing chelants such as ethylenediaminetetraacetic acid, ethyldiamine and methylformamide and organic acids, such as oxalic acid or iminodiacetic acid.

E) Buffering agents. Buffered compositions can be adjusted to span the pH range from near-neutral to basic. Mono, di and polyprotic acids may act as buffers, and when fully or partially de-protonated with bases such as ammonium hydroxide. Ammonium salts of the acids are suitable, but other alkali and alkaline earth metal salts of the carboxylic acids may be used. Representative examples include salts of carboxylic acids include, for example, mono-carboxylic acids, di-carboxylic acids, tri-carboxylic acids, and poly-carboxylic acids. Specific compounds include, for example, malonic acid, oxalic acid, citric acid, tartaric acid, succinic acid, malic acid, adipic acid, salts thereof, and mixtures thereof. Nitrogen containing compounds that may buffer the slurry include: aspartic acid, glutamic acid, histidine, lysine, arginine, ornithine, cysteine, tyrosine, and carnosine, bis(2-hydroxyethyl)iminotris(hydroxymethyl)methane, tris(hydroxymethyl)aminomethane, N-(2-Acetamido)-2-iminodiacetic acid, 1,3-bis[tris(hydroxymethyl)methylamino]propane, triethanolamine, N-tris(hydroxymethyl)methylglycine, N,N-bis(2-hydroxyethyl)glycine, and glycine. Ammonium hydrogen phosphate may also be used in the slurry.

F) Surfactants, emulsifying agents, viscosity modifiers, wetting agents, lubricants, soaps, and the like. Typical surfactants include non-ionic, anionic, cationic, zwitterionic, amphoteric and polyelectrolyte compounds. Examples include organic acids, alkane sulfates, alkaline sulfonates, hydroxides, substituted amine salts, betaines, polyethylene oxide, polyvinyl alcohol, polyvinyl acetate, polyacrylic acid, polyvinyl pyrrolidone, polyethyleneimine, sodium alkylbenzenesulfonate tetramethyl ammonium halides, cetyl trimethyl ammonium halides, nonyl ethers, and combinations thereof.

b. Polishing Pads

The kit may further comprise a polishing pad to be used in conjunction with the polishing composition to treat the sapphire surface. The polishing pad may comprise a resin, or a woven or non-woven material. For example, the polishing pad may include a polyurethane pad or a polyurethane impregnated fiber-based material, such as a polyester felt or suede.

The polishing pad may have a compressibility of about 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 18%, 18.5%, 19%, 19.5%, 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, 35%, 35.5%, 36%, 36.5%, 37%, 37.5%, 38%, 38.5%, 39%, 39.5% or 40%.

The polishing pad may have a Shore C hardness of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100.

The polishing pad may have a Shore D hardness of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100.

The polishing pad may have an Asker C hardness of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100.

The polishing pad may have a JIS hardness of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100.

Suitable pads are available under the trade name SUBA™ from Rohm & Haas. For example, a SUBA™ 500 pad has a relatively low compressibility (about 13%) and a Shore D hardness of about 55. A SUBA™ 600 pad has a compressibility of about 4% and an Asker C hardness of about 80. A SUBA™ 800 pad has a compressibility of about 4% and an Asker C hardness of about 82. Additionally, MHN and MHS pads, available through Rohm & Haas, are a polyurethane pads with very low compressibility (about 3%) and a JIS hardness of about 84.

c. Other Elements

The kit may further comprise additional elements. For example, a kit may also include instructions for use of the polishing composition and/or the polishing pad. Instructions included in kits can be affixed to packaging material or can be included as a package insert. While the instructions are typically written or printed materials they are not limited to such. Any medium capable of storing such instructions and communicating them to an end user is contemplated by this disclosure. Such media include, but are not limited to, electronic storage media (e.g., magnetic discs, tapes, cartridges, chips), optical media (e.g., CD, DVD), and the like. As used herein, the term "instructions" can include the address of an internet site that provides the instructions. The various components of the kit optionally are provided in suitable containers as necessary, e.g., a bottle, jar or vial.

3. METHODS OF POLISHING SAPPHIRE SURFACES

Disclosed herein are also methods for polishing sapphire surfaces using the kit as described above or a composition comprising colloidal silica particles having a broad particle size distribution. The method comprises abrading a sapphire surface with a rotating polishing pad and a polishing composition, wherein the polishing composition comprises an effective amount of colloidal silica, and wherein the colloidal silica has a broad particle size distribution.

For example, the methods disclosed herein may involve chemical mechanical polishing (CMP). The main objectives of CMP are to smooth surface topography of dielectric deposits to enable multilevel metallization, or to remove excess coating material to produce inlaid metal damascene structures and shallow isolation trenches. While the mechanisms of material removal in CMP are not completely understood, in general the oxide substrates can be chemically treated at the surface to quickly create a more brittle or softer thin film. This surface film is then "gently" abraded to a uniform planarity using formulations containing both chemical and abrasive components.

In the methods of the invention, the polishing composition may be applied to a surface of a sapphire surface, such as a wafer, mounted in a rotating carrier. The sapphire surface may then be abraded using a rotating polishing pad. Typically, at least a portion of the polishing slurry remains disposed between the polishing surface of the pad and the surface of the sapphire surface during the process. The polishing pad has a planar polishing surface that rotates about an axis of rotation perpendicular to the sapphire surface at a selected rotation rate. The rotating polishing surface of the pad is pressed against the sapphire surface with a selected level of downforce perpendicular to the sapphire surface. The polishing composition may be applied to the sapphire surface by continuously supplying the slurry onto the sapphire surface while the rotating polishing pad is pressed against the sapphire surface.

The combined action of the rotating polishing pad and polishing slurry may remove sapphire from the surface at a rate that is greater than the sapphire removal rate achievable by abrading the sapphire surface with the same pad, at the same rate of rotation, and the same down-force, using a polishing composition having colloidal silica particles of a narrow size distribution.

The polishing pad may be pressed against the sapphire surface with a down-force of about 5 psi to about 25 psi, e.g., about 10 psi to about 20 psi, or about 12 psi to about 16 psi. For example, the pad may be applied to the sapphire surface with a down-force of about 5, 6, 7, 8, 9, 10, 11, 12, 13, 14, 15, 16, 17, 18, 19, 20, 21, 22, 23, 24 or 25 psi. The polishing pad may be rotated at a rate of about 40 to about 120 revolutions per minute (rpm), or about 60 to 80 rpm. For example, the polishing pad may be rotated at a rate of about 40, 45, 50, 55, 60, 65, 70, 75, 80, 85, 90, 95, 100, 105, 110, 115 or 120 rpm.

In the methods, the sapphire surface may be polished for about 120 min, 125 min, 130 min, 140 min, 145 min, 150 min, 155 min, 160 min, 165 min, 170 min, 175 min, 180 min, 185 min, 190 min, 195 min, 200 min, 205 min, 210 min, 215 min, 220 min or 225 min.

The methods may be useful for polishing or planarizing a C-plane or R-plane surface of a sapphire wafer, and may provide material removal rates that are significantly higher than those achieved with conventional abrasive slurries, such as those having narrow particle size distributions. Removal rates may be at least about 10%, 15%, 20%, 25%, 30%, 35%, 40%, 45%, 50%, 55%, 60%, 65%, 70%, 75%, 80%, 85% or 90% higher the removal rate obtainable with a slurry having a narrow particle size distribution.

The methods can be carried out utilizing any abrasive polishing equipment. Suitably, the polishing is accomplished with sapphire wafers mounted in a rotating carrier, using a rotating polishing pad applied to the surface of the wafers at a selected down-force (e.g., with a down-force in the range of about 2 to about 20 psi) at a selected pad rotation rate (e.g., about 20 to about 150 rpm), with the wafers mounted on a carrier rotating at a selected rotation rate (e.g., about 20 to about 150 rpm). Suitable polishing equipment is commercially available from a variety of sources, such as CETR (Campbell, Calif.) and SpeedFam (Kanagawa, Japan). For example, a CP-4 CMP testing instrument or a SpeedFam GPAW32 instrument may be used.

The method may improve final surface roughness of a sapphire surface by providing a material removal rate (MRR) of at least about 30 nm/minute, 31 nm/minute, 32 nm/minute, 33 nm/minute, 34 nm/minute, 35 nm/minute, 36 nm/minute, 37 nm/minute, 38 nm/minute, 39 nm/minute, 40 nm/minute, 41 nm/minute, 42 nm/minute, 43 nm/minute, 44 nm/minute, 45 nm/minute, 46 nm/minute, 47 nm/minute, 48 nm/minute, 49 nm/minute, 50 nm/minute, 51 nm/minute, 52 nm/minute, 53 nm/minute, 54 nm/minute, 55 nm/minute, 56 nm/minute, 57 nm/minute, 58 nm/minute, 59 nm/minute, 60 nm/minute, 61 nm/minute, 62 nm/minute, 63 nm/minute, 64 nm/minute, 65 nm/minute, 66 nm/minute, 67 nm/minute, 68 nm/minute, 69 nm/minute, or 70 nm/minute, depending upon the pounds per square inch (PSI) pressure and the pad used on the sapphire surface. The method may achieve a material removal rate (MRR) from the sapphire surface of 40.0 nm/minute, 40.5 nm/minute, 41.0 nm/minute, 41.5 nm/minute, 42.0 nm/minute, 42.5 nm/minute, 43.0 nm/minute, 43.5 nm/minute, 44.0 nm/minute, 44.5 nm/minute, 45.0 nm/minute, 45.5 nm/minute, 46.0 nm/minute, 46.5 nm/minute, 47.0 nm/minute, 47.5 nm/minute, 48.0 nm/minute, 48.5 nm/minute, 49.0 nm/minute, 49.5 nm/minute, 50.0 nm/minute, 50.5 nm/minute, 51.0 nm/minute, 51.5 nm/minute, 52.0 nm/minute, 52.5 nm/minute, 53.0 nm/minute, 53.5 nm/minute, 54.0 nm/minute, 54.5 nm/minute, 55.0 nm/minute, 55.5 nm/minute, 56.0 nm/minute, 56.5 nm/minute, 57.0 nm/minute, 57.5 nm/minute, 58.0 nm/minute or 58.5 nm/minute removal rate from a sapphire surface.

The method may provide a root mean square (RMS) roughness, or $R_q$, of a sapphire surface of less than or equal to 2.0 nm, 1.9 nm, 1.8 nm, 1.7 nm, 1.6 nm, 1.5 nm, 1.4 nm, 1.3 nm, 1.2 nm, 1.1 nm, 1.0 nm, 0.9 nm, 0.80 nm, 0.70 nm, 0.60 nm, 0.50 nm, 0.40 nm, 0.30 nm, 0.20 nm or 0.10 nm, from an initial RMS of up to 1 micron after polishing the sapphire surface for a period of time (e.g., about 180 minutes). The kit may achieve a RMS roughness of a sapphire surface of less than or equal to 5.0 Å, 4.9 Å, 4.8 Å, 4.7 Å, 4.6 Å, 4.5 Å, 4.4 Å, 4.3 Å, 4.2 Å, 4.1 Å, 4.0 Å, 3.9 Å, 3.8 Å, 3.7 Å, 3.6 Å, 3.5 Å, 3.4 Å, 3.3 Å, 3.2 Å, 3.1 Å, 3.0 Å, 2.9 Å, 2.8 Å, 2.7 Å, 2.6 Å, 2.5 Å, 2.4 Å, 2.3 Å, 2.2 Å, 2.1 Å, 2.0 Å, 1.9 Å, 1.8 Å, 1.7 Å, 1.6 Å, or 1.5 Å after polishing of the sapphire surface for a period of time (e.g., about 180 minutes).

The method may provide a roughness average, or $R_a$, of a sapphire surface of equal to or less than 1.8 nm, 1.7 nm, 1.6 nm, 1.5 nm, 1.4 nm, 1.3 nm, 1.2 nm, 1.1 nm, 1.0 nm, 0.9 nm, 0.80 nm, 0.70 nm, 0.60 nm, 0.50 nm, 0.40 nm, 0.30 nm or 0.20 nm after polishing of the sapphire surface for a period of time (e.g., about 180 minutes). The kit may achieve a roughness average of a sapphire surface of 4.5 Å, 4.4 Å, 4.3 Å, 4.2 Å, 4.1 Å, 4.0 Å, 3.9 Å, 3.8 Å, 3.7 Å, 3.6 Å, 3.5 Å, 3.4 Å, 3.3 Å, 3.2 Å, 3.1 Å, 3.0 Å, 2.9 Å, 2.8 Å, 2.7 Å, 2.6 Å, 2.5 Å, 2.4 Å, 2.3 Å, 2.2 Å, 2.1 Å, 2.0 Å, 1.9 Å, 1.8 Å, 1.7 Å, 1.6 Å, or 1.5 Å after polishing of the sapphire surface for a period of time (e.g., about 180 minutes).

The method may also allow for effective polishing of a sapphire surface without significant increases in temperature during the polishing process. For example, the temperature may increase by less than 0.1, 0.2, 0.3, 0.4, 0.5, 0.6, 0.7, 0.8, 0.9, 1, 2, 3, 4, 5, 6, 7, 8, 9 or 10° C. during the polishing.

The Coefficient of Friction (CoF) may be monitored over the course of a polish time (e.g., a polish time described herein, such as 180 min). Such monitoring may indicate that the CoF increases by about 0.05, 0.10, 0.15, 0.20, 0.25, 0.30, 0.35, 0.40, 0.45 or 0.50 over the course of the polish time.

4. METHODS OF PREPARING BROAD DISTRIBUTION COLLOIDAL SILICA COMPOSITIONS

The polishing composition may be synthesized through a continuous manufacturing process. Broad distribution colloidal silica compositions may be prepared by any suitable means known in the art. In some embodiments, the compositions may be obtained by an engineered continuous manufacturing process. In other embodiments, the compositions may be obtained through blending of specified particle sizes in defined ratios.

a. Engineered Continuous Manufacturing Processes

A suitable engineered continuous manufacturing process may include the steps of providing preformed silica particles having a predetermined particle size or particle size distribution, providing an alkaline agent, and providing a silicic acid. These components are typically fed into a reactor at a controlled rate which will prevent new nucleation from occurring in the reaction vessel. In a continuous reactor, particle size and distribution remain generally constant after steady state conditions are achieved. The particle size distribution of the compositions may be precisely controlled in a single reactor continuous process. To ensure that only the preformed colloidal particles are grown upon, the feed rate of the silicic acid is maintained at a rate less than the nucleation rate for forming new particles.

The feed rate may be 10.0 grams of silica, as $SiO_2$, per 1,000 meters squared of surface area per hour at 90° C., so that new nucleation is avoided entirely. This feed rate is temperature-dependent with higher feed rates possible with higher temperatures. In this manner, colloidal silica can be "grown" to any desired particle size, while maintaining a desired particle size distribution and avoiding nucleation of new particles. By monitoring the feed rate of each component, the accretion of resulting colloidal silica can be maximized and therefore, the production of the silica can be maximized.

Another feed component for the engineered continuous manufacturing process includes a preformed colloidal particle. Typically, this component includes colloidal particles having a narrow distribution. The silicic acid deposits on these particles during the formation of the broad particle size distribution silica. Therefore, the particle size of the preformed particles used is the desired minimum particle size of the resulting broad distribution product, and essentially all of the produced colloidal silica particles are larger than the preformed silica sol particles. The desired average particle size and particle size distribution of the resultant silica sol is typically identified and the preformed silica and the ratio of preformed silica to silicic acid are accordingly used. Increasing the particle size of the preformed silica sol particles increases the minimum and average particle size of resulting colloidal silica.

An exemplary method of preparing the silicic acid solution is to pass a sodium silicate solution through a bed of $H^+$-cation exchange resin. The resulting deionized silicic acid solution tends to be quite reactive and is typically kept cooled to retard polymerization. Upon addition of the silicic acid solution to the alkaline solution to form the "feed silica" or heel. The heel or feed silica contains alkaline agents, such as NaOH, KOH, $NH_4OH$, the like, and combinations thereof.

Typically, silicic acid has a concentration of 4 to 8% and has a pH in the range of about 2 to 4. Any silicic acid that can be used for other silica particle growth techniques is contemplated for use in the present invention. It should be appreciated that any suitable type of silicic acid solution can be utilized and that the silicic acid may be made by through any suitable methodology.

The feed rate of the silicic acid should be maintained below the rate at which new nucleation occurs. The maximum feed rate is dependent on the reactor volume and the reaction temperature. The greater the volume, the greater the maximum feed rate. The higher the temperature, the greater the maximum feed rate. For a typical continuous system that does not use preformed colloidal particle feed, new particles are formed in the reactor. Through the method of this invention, a minimum particle size boundary may be maintained.

The alkaline agent feed component to the reactor system is typically a base material to maintain an alkaline system. Alkalines normally used in silica sol production are all acceptable. Typical alkaline agents have pH ranges (ideal for silica sol production) between about 8.0 to about 12.5. Dilute solutions are normally used to prevent gel formation. Examples of suitable alkaline agents include, but are not limited to, sodium hydroxide, potassium hydroxide, ammonium hydroxide, sodium silicate, potassium silicate, the like, and combinations thereof.

The minimum particle size of the resulting colloidal silica may be controlled by the particle size of the preformed silica sol, and wherein the broad particle size distribution is dependent on the ratio of the preformed silica sol to the silicic acid. For example, increasing the ratio of silicic acid to preformed colloidal silica will broaden the distribution curve and also increases the average particle size. To keep the same average particle size, but narrow the distribution curve, a larger preformed particle and increased silicic acid to preformed colloidal silica ratio may be used.

In an embodiment, the reactor used for this invention is a single overflow unit. Heat input is necessary with reaction temperatures typically greater than 40° C. Maximum temperatures are normally dependent on the reactor pressure rating. Upper end temperatures of 150° C. to 200° C. are typical. However, if the reactor has a higher pressure rating, higher temperatures could be employed.

As with other continuous systems, this system may be operated long enough to achieve steady-state conditions. After the first run, previously made product can be used for the initial reactor contents (assuming the same product is to be made). According to this embodiment, steady-state conditions are maintained in the reactor by seeding the reactor with produced colloidal silica particles from a previous run.

Accordingly, the broad particle size distribution colloidal silica particles may be produced by a method comprising, in any order: (a) feeding a first component including preformed silica sol particles of predetermined minimum particle size to at least one agitated, heated reactor; (b) adding a second component including silicic acid to said reactor, wherein the second component is fed to the reactor at a rate that is less than a new silica particle nucleation rate; (c) adding a third component including an alkaline agent to the reactor; and (d) wherein the minimum particle size of the resulting colloidal silica is controlled by the particle size of the first component, and wherein the broad particle size distribution is dependent on the ratio of the feed rates of the first component to the second component.

In some embodiments, essentially all of the produced colloidal silica particles are larger than the preformed silica sol particles of the first component. In some embodiments, an average particle size of the broad particle size distribution is determined by an average particle size of the first component. In some embodiments, an average particle size of the broad particle size distribution is determined by the ratio of the feed rates of the first component to the second component. In some embodiments, increasing said ratio causes the broad particle size distribution curve to become wider. In some embodiments, the method includes causing an average particle size of the broad particle size distribution curve to increase. In some embodiments, the method includes creating a narrower particle size distribution curve without changing an average produced particle size by including in the first component larger preformed silica sol particles and increasing a second component to first component feed rate ratio. In some embodiments, said reactor is a single overflow reactor. In some embodiments, said reactor is a series of reactors. In some embodiments, the method includes concentrating the produced colloidal silica particles. In some embodiments, the method includes concentrating via evaporation during the reaction. In some embodiments, said reactor is maintained at a temperature in the range of about 40 to about 200° C. In some embodiments, the alkaline agent maintains a pH from about 8.0 to about 12.5. In some embodiments, said reactor is held at a constant volume by continuous removal of the produced colloidal silica from the reactor. In some embodiments, the method includes operating the method as a continuous process. In some embodiments, the method includes maintaining steady-state conditions in said reactor by seeding the reactor with produced colloidal silica particles from a previous run of the reactor.

b. Blending Processes

A blending process may include the steps of providing preformed silica particles having predetermined particle sizes or particle size distributions, and blending the particles to provide a composition having a broad particle size distribution. For example, a process may involve selection of two or more unimodal colloidal silica compositions having an average particle size of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 nm. The two or more compositions may be blended in desired ratios to produce a composition having a broad particle size distribution.

The invention encompasses any and all possible combinations of some or all of the various embodiments described herein. Any and all patents, patent applications, scientific papers, and other references cited in this application, as well as any references cited therein, are hereby incorporated by reference in their entirety.

The present invention has multiple aspects, some of which are illustrated by the following non-limiting examples.

EXAMPLES

General Materials and Methods 3 inch diameter C-plane (0001) as-cut and ground sapphire wafers were obtained from Roditi, Inc. and GT Crystal Systems. Polishing pads were purchased from Eminess Technologies of Monroe, N.C. Unless otherwise noted, polishing experiments were conducted using a CP-4 CMP testing instrument, manufactured by CETR of Campbell, Calif. Additional specified polishing studies were performed on a SpeedFam 32 GPAW instrument. A schematic of the polishing process is shown in FIG. 1.

AFM images were obtained with a Digital Instruments Dimension 3100 microscope from Veeco Metrology Group, equipped with a Nanoscope IIIa controller. Images were collected in contact mode using either a Vistaprobe CSR-10 etched silicon probe tip (length 225 μm, resonant frequency of 28 kHz, nominal spring constant 0.1 N/m) or an Applied Nano Sicon probe (13 kHz resonant frequency, 0.17 N/m nominal spring constant).

In order to obtain statistically significant data on roughness and other surface characteristics, a minimum of five locations were normally examined on each sapphire wafer, evaluating the center as well as the edges of the wafer at several locations. Generally, five different square image areas were examined: 75 μm, 25 μm, 5 μm, 1 μm, and 500 nm. Data was analyzed with the Digital Instruments Nanoscope IIIa® software, version 5.3 lrl. Top view and surface plots were constructed and surface roughness calculations performed on the original height data. The only data manipulation consisted of standard $2^{nd}$ or $3^{rd}$ order plane-fits and flatten parameters to remove piezoelectric hysteresis effects common with piezo scanners. $2^{nd}$ order plane-fits were generally applied to smaller area images such as 1 um-10 um areas while $3^{rd}$ order plane-fits were applied to larger areas.

The roughness of the sapphire surface was evaluated in a number of different ways. The Z-range is the difference in height between the maximum and minimum features in the image area. This feature can be misleading as a perfectly flat surface with a piece of dust on it would register a high Z-range. However, when viewed in the context of a relatively rough surface free of contamination, it provides a visual representation of extreme features.

The root-mean-square (RMS) roughness, $R_q$, is the standard deviation of the Z values within a given area and is represented by Equation 1:

$$R_q = \left(\sum_{i=1}^{N}(Z_i - Z_{avg})^2 / N\right)^{1/2} \qquad \text{Eq. 1.}$$

$Z_{avg}$ is the average Z value within the given area, $Z_i$ is the Z value of interest (point or pixel), and N is the number of points within a given area. Thus, a perfectly flat surface would have $R_q = 0$. A nonzero but low $R_q$ would indicate that although the surface may be rough, the features contributing to the roughness are all approximately equal. A high $R_q$ on the other hand would indicate a high degree of variability between features.

The mean roughness, $R_a$, is the arithmetic average of the deviations from the center plane and is represented by Equation 2:

$$R_a = \sum_{i=1}^{N} |Z_i - Z_{cp}| / N \qquad \text{Eq. 2.}$$

$Z_{cp}$ is the Z value of the center plane, $Z_i$ is again the Z value of interest, and N is the number of points in a given area. The mean roughness is actually akin to a median then, as the center plane is used instead of the average in Eq. 1. As with means and medians, it would be expected that the roughness calculated by Eq. 1 might be more susceptible to skewing by features or contaminants that produce spikes in the data.

The material removal rate of the sapphire is determined gravimetrically, using an analytical top loading balance capable of measuring to 0.0001 g. Knowing the density of sapphire is 3.98 g/cm³, a 0.001 gram loss is equivalent to a 55.1 nm uniform loss across the surface of the 3 inch (7.62 cm) wafer. Therefore, material removal rate can be calculated by the following conversion equation:

$$\text{Material Removal rate (nm/min)} = \frac{\text{wt loss (g)} \times 1000 \text{ mg/g} \times 55.1 \text{ nm/mg}}{\text{polishing time (min)}}$$

Example 1

Characterization of Colloidal Silica Slurries

Colloidal silica slurries were prepared by diluting colloidal silica products deionized (DI) water and adjusting the pH to 10.2 with 0.1 M NaOH. Representative data and properties of colloidal silica slurries used in these examples are presented in Table 1. Particle size characteristics are based on Transmission Electron Microscopy (TEM), Dynamic Light Scattering (DLS) and/or Sears titration, and range in size from approximately 30-105 nm.

Composition 1 includes a broad distribution, potassium-stabilized sol averaging 25 nm by titration and 85 nm by DLS. These particles are potassium-grown in a continuous process and concentrated via ultrafiltration (UF) to about 40% solids. Such compositions are commercially available as Nalco® 13184.

To prepare Composition 1, 12860 grams of the above product at pH 9.1 and 31.1% solids was diluted to 20000 grams with deionized water. The pH was then adjusted to 10.1 with 250 grams of 0.1M NaOH. The resulting slurry was analyzed at 19.9% solids.

Composition 2 is made up of a multimodal, sodium stabilized sol with a nominal particle size of approximately 25 nm with over 50% of the particles between 40 and 120 nm. TEM particle sizing indicates an average particle size of 36 nm. This composition is a blend of 3 different sodium grown unimodal compositions of approximately 25, 50 and 80 nm which are then blended to obtain the correct particle size distribution and concentrated via UF to approximately 50% solids. Such compositions are commercially available as Nalco® 1060.

To prepare Composition 2, 7628 grams of the above product at pH 8.7 and 49.7% solids was diluted to 18935 grams with deionized water. The pH was then adjusted to 10.1 with 250 grams of 0.1M NaOH. The final slurry was analyzed at 19.8% solids.

Composition 3 includes a broad distribution, potassium stabilized sol averaging 38 nm by titration and 85 nm by DLS. These particles are potassium-grown in a continuous process and concentrated via UF to 40% solids, prepared in a manner similar to that of the particles of Composition 1. Such compositions are commercially available as Nalco® DVSTS029.

To prepare Composition 3, 7527 grams of the above product at pH 9.65 and 50.4% solids was diluted to 18948 grams with deionized water. The pH was then adjusted to 10.1 with 20 grams of 1.0 M NaOH. The resulting slurry was analyzed at 20.2% solids.

Composition 4 includes a narrow distribution colloidal silica averaging 80 nm by DLS. These particles are commercially sodium-grown and then concentrated via ultra-filtration (UF) to 40% solids. Such compositions are commercially available as Nalco® 2329K.

To prepare Composition 4, 9919 grams of the above product at 8.29 and 40.4% solids was diluted to 19602 grams with deionized water. The pH was then adjusted to 10.0 with 20 grams of 1.0 M NaOH. The resulting slurry was analyzed at 20.6% solids.

Composition 5 includes a narrow distribution colloidal silica. These particles are commercially sodium-grown and then concentrated via ultra-filtration (UF) to 48% solids. Such compositions are commercially available as Nalco® 2329Plus.

To prepare Composition 5, 7978 grams of the above product at pH 9.89 and 47.6% solids was diluted to 18941 grams with deionized water. The pH was then adjusted to 10.5 with 20 grams of 1.0 M NaOH. The resulting slurry was analyzed at 20.1% solids.

Composition 6 is made up of a multimodal, sodium stabilized sol with a nominal particle size of approximately 22 nm with over 85% of the particles below 38 nm. TEM particle sizing indicates an average particle size of 22 nm. This composition is a blend of 5 different sodium grown unimodal colloidal silica compositions of approximately 12, 25, 50, 80 and 100 nm, which are then blended to obtain the correct particle size distribution and concentrated via UF to approximately 50% solids.

To prepare Composition 6, 7628 grams of the above product at pH 9.5 and 49.7% solids was diluted to 18935 grams with deionized water. The pH was then adjusted to 10.1 with 250 grams of 0.1M NaOH. The final slurry was analyzed at 19.8% solids.

TABLE 1

Physical Properties of Colloidal Silica Polishing Compositions

| Product | pH | % SiO$_2$ by Ash solids (%) | Particle Size by Titration (nm) | Particle Size by QELS (nm) |
|---|---|---|---|---|
| Composition 1 | 10.1 | 19.9 | 22.7 | 58.1 |
| Composition 2 | 10.1 | 19.8 | 67.8 | 91.1 |
| Composition 3 | 10.1 | 20.2 | 32.66 | 81.5 |
| Composition 4 | 10.0 | 20.6 | 77.7 | 85.6 |
| Composition 5 | 10.5 | 20.1 | 95.9 | 97.3 |
| Composition 6 | 10.1 | 19.8 | 6.8 | 88.0 |

Figure 2:
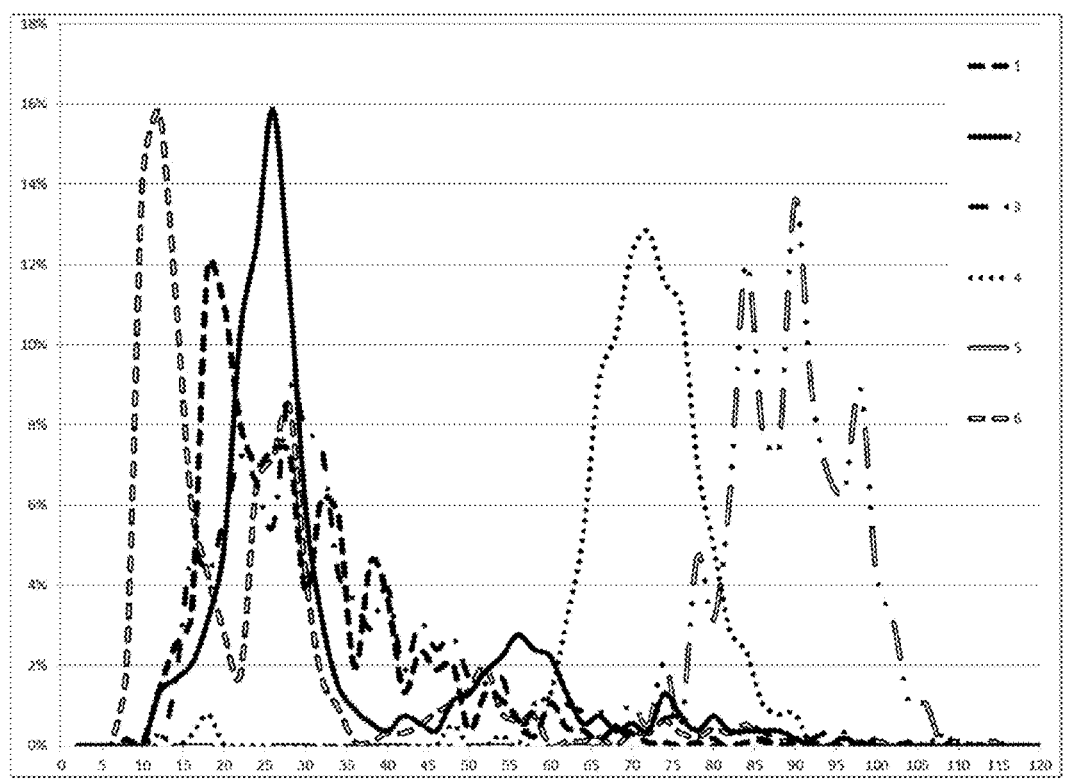
FIG. 2 is a graph of particle size distributions of colloidal silica compositions.

FIG. 2 displays overlays of the TEM PSDs for each of the compositions. In general, the colloidal silica compositions described as broad PSD sols are seen as non-Gaussian, and have average particle sizes significantly different than the mode values, defined here as the nominal particle size. In contrast, the unimodal sols have particle sizes ranging over a limited, Gaussian distribution with the mode and average particle size values being essentially equivalent. Broad distributions can be described in terms of the ratio between the TEM average particle size, r, and the standard deviation, σ, of the distribution, using the convention described in U.S. Pat. No. 6,910,952. Using this index, the abrasive particles studied clearly fall into two groups: those which are seen as tight, unimodal, Gaussian distributions result in a σ/r ratio of less than 0.15, while the broad, non-Gaussian distributions have ratios greater than 0.45. Further analysis of the TEM PSD histograms allows for the relative percentages of particles counted in size "bins" roughly correlated to the particle sizes of the unimodal distributions. These TEM analyses are presented in Table 2.

TABLE 2

TEM Particle Size Distribution Analysis Data for Colloidal Silica Compositions

| Product | Description[1] | Average Particle Diameter, r (nm) | Standard Deviation (σ) | σ/r | % <38 nm | % 40-60 nm | % 60-80 nm | % 80-120 nm |
|---|---|---|---|---|---|---|---|---|
| Composition 1 | Broad PSD, 20 nm Nominal | 26.5 | 12.42 | 0.467 | 85.6 | 10.39 | 1.8 | 0.3 |
| Composition 2 | Broad PSD, 22 nm | 37.1 | 19.8 | 0.534 | 60 | 23.8 | 9.7 | 3.9 |

TABLE 2-continued

TEM Particle Size Distribution Analysis Data for Colloidal Silica Compositions

| Product | Description[1] | Average Particle Diameter, r (nm) | Standard Deviation (σ) | σ/r | % <38 nm | % 40-60 nm | % 60-80 nm | % 80-120 nm |
|---|---|---|---|---|---|---|---|---|
| Composition 3 | Nominal Broad PSD, 28 nm Nominal | 33.7 | 16.1 | 0.478 | 70.5 | 17.7 | 5.7 | 2.2 |
| Composition 4 | Nominal Gaussian PSD, 70 nm Nominal | 70.4 | 9.14 | 0.13 | 1.31 | 3.14 | 87.4 | 8.12 |
| Composition 5 | Nominal Gaussian PSD, 90 nm Nominal | 88.3 | 7.56 | 0.086 | 0 | 0 | 12.6 | 87.4 |
| Composition 6 | Nominal Broad PSD, 12 nm Nominal | 22.3 | 16.3 | 0.734 | 87.4 | 8.23 | 2.60 | 1.46 |

[1]Nominal Particle Size is defined as the Mode value obtained from the TEM Sizing analysis.
The Mode value is the value most often obtained in the analysis.

Figure 3:
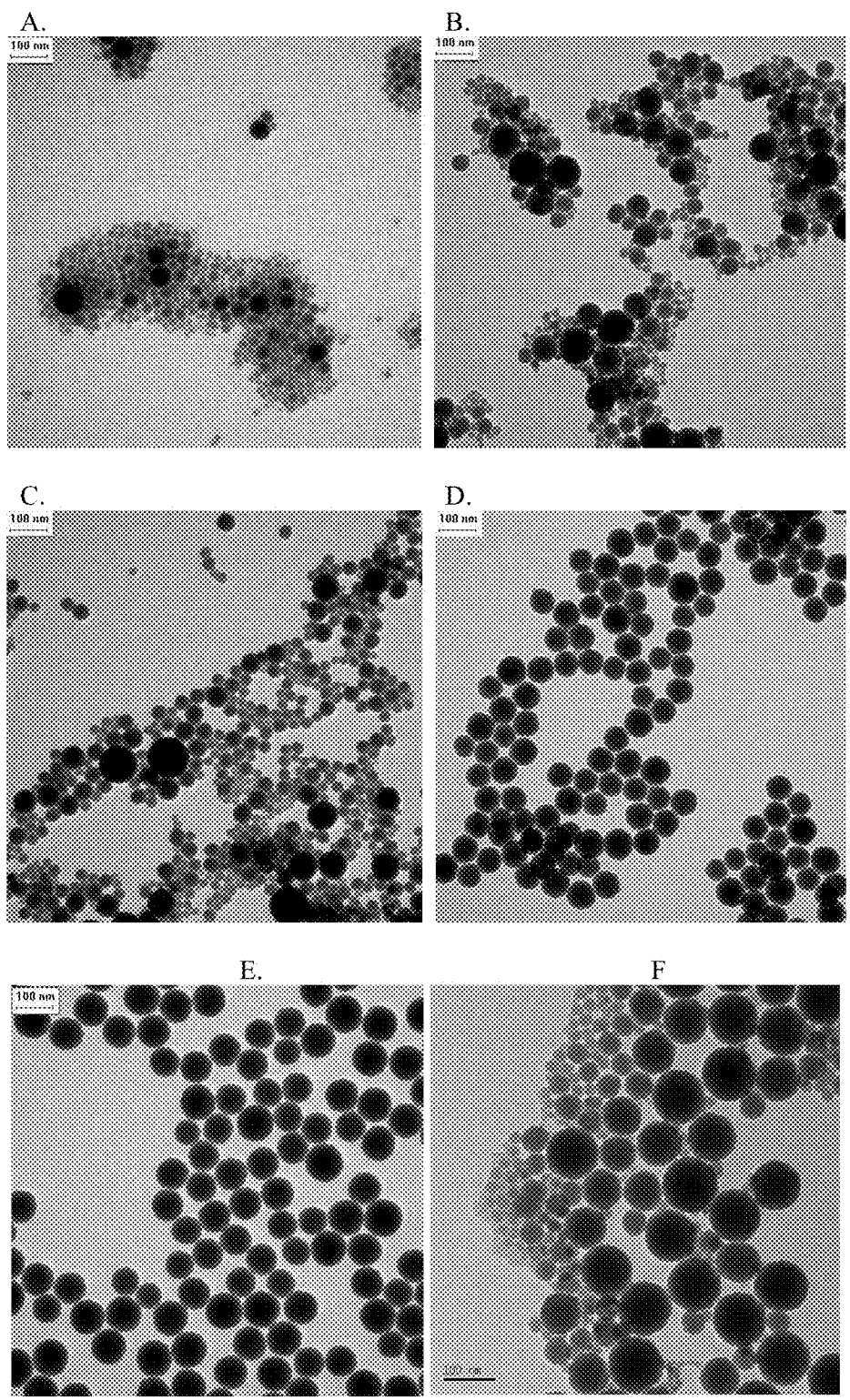
FIG. 3 shows TEM images of colloidal silica compositions described herein: A) Composition 1; B) Composition 2; C) Composition 3; D) Composition 4; E) Composition 5.

FIG. 3 also illustrates representative TEM images of each composition.

Example 2

Sapphire Polishing Tests

Polishing tests were performed using three different polishing pads:
SUBA™ 500: Polyurethane impregnated polyester felt pad with a compressibility of 13% and a Shore D hardness of 55.
SUBA™ 600: Polyurethane impregnated polyester felt pad with a compressibility of 4% and an Asker C hardness of 80.
SUBA™ 800: Polyurethane impregnated polyester felt pad with a compressibility of 4% and an Asker C hardness of 82
MHN Pad: Polyurethane resin felt pad with a compressibility of 3% and an JIS hardness of 84.

Pad conditioning opens up closed or glazed cells in the polyurethane polishing pad when new or after every use. This may improve the transport of slurry to the wafer, and may provide a consistent polishing surface throughout the pad's lifetime, resulting in less wafer to wafer polishing variability. In the pad conditioning process, the conditioning ring replaces the wafer carrier on the instrument with a minimum down force applied to the pad surface. Table 3 summarizes the conditioning parameters used to condition the pads in this study.

TABLE 3

Conditioning parameters for polishing pads.

| Parameter | CETR CP-4 Polisher parameters | Speedfam GPAW 32 Polisher parameters |
|---|---|---|
| Conditioning pad | CETR diamond abrasive embedded grid on 4 inch platen | Speedfam diamond abrasive embedded grid on 12 inch platen |
| Slurry | Deionized water | Deionized water |
| Slurry flow rate | 100 ml/min | 600 ml/min |
| Velocity | 10 mm oscillation @ 10 per minute Conditioner carrier 65 rpm; polishing pad 65 rpm | Polishing pad 65 rpm Conditioner pad 65 rpm |
| Conditioning pressure | 0.1 psi | 0.1 psi |
| Conditioning time | 10 minutes | 10 minutes |

The CP-4 CMP testing instrument can accommodate 2 to 4 inch wafers and a 9 inch platen pad. During polishing, the friction force, the coefficient of friction (CoF) at the wafer pad interface and the platen pad temperature are continuously monitored in-situ. The process conditions used in this example are summarized in Table 4.

The Speedfam GPAW 32 polisher has a 32 inch platen pad and 4 polishing heads, each equipped with mounting templates to accommodate 3 or 8 3 inch wafers. During polishing, the platen pad temperature is monitored. The process conditions used in this example are summarized in Table 4.

TABLE 4

Polishing parameters

| Parameter | CETR CP-4 parameters | Speedfam GPAW32 parameters |
|---|---|---|
| Slurry flow rate | 100 mL/min | 600 mL/min |
| Slurry concentrations | 20% SiO$_2$ | 20% SiO$_2$ |
| Velocity | Wafer carrier 65 rpm; polishing pad 65 rpm | Polishing pad rpm; wafer carrier free rotation under friction |
| Polishing pressure | 7.11, 10.00 and 12.00 psi | 7.11, 10.00 and 12.00 psi |
| Polishing time | 20 minutes and 180 minutes | 180 minutes |
| Number of replicate polishing runs | 2-6 runs of 1 wafer each | 2-6 runs of 3-8 wafers each |

All wafers were polished keeping the platen speeds consistent in all runs, while varying the run times, processing pressure, pad, colloidal silica abrasive and abrasive concentration. For the CETR CP-4 system, the wafer carrier rotation is motor driven and controlled during polishing. For the Speedfam GPAW32, the wafer carrier heads are not motor driven, but rather the wafers freely rotate under the friction force of the polishing process. In general, all compositions display Prestonian behavior, where the material removal rate (MRR) is a linear function of the downforce pressure and the rotation velocity. However the slope of the line, and therefore the degree of influence of each of these variables, varies greatly with the polishing composition. Likewise, the MRRs are largely dependent upon the concentration of the colloidal silica in the polishing slurry, with greater drop off in rate with decreasing concentration of the largest particles. The impact of the nominal particle size of the colloidal silica sols studied is explored further at the industry standard solids loading of 20% $SiO_2$. For discussion purposes, subsets of that data will be summarized here.

Table 5 summarizes the removal rates obtained for C-plane sapphire polishing studies run under common processing parameters. The silica sols were diluted to 20% silica solids with deionized water and pH adjusted to greater than 9.5. Two downforce pressures of 7.11 and 10.00 psi were evaluated for three SUBA™ pads and one MH-N pad, with all wafers polished for 180 minutes. For comparative purposes, an initial test was run with the SUBA 500 pad, where the downforce was increased to 12.00 psi and the wafers were polished for only 2 hours.

TABLE 5

C-plane sapphire material removal rates (nm/minute)

| Composition | Process A[1] | Process B | Process C | Process D | Process E | Process F |
|---|---|---|---|---|---|---|
| 1 | — | — | — | 42 | — | |
| 2 | 41.0 | 22.8 | 13.9 | 51.5 | 26.5 | 32.1 |
| 3 | 37.8 | 15.5 | 17.3 | 47 | 20.1 | |
| 4 | 28.8 | 25.5 | 21.9 | 36 | | 35.4 |
| 5 | 16.9 | 22 | 17.2 | 24.5 | 26.9 | 30.6 |
| 6 | | 22.6 | | 39.0 | | 27.2 |

Figure 4:
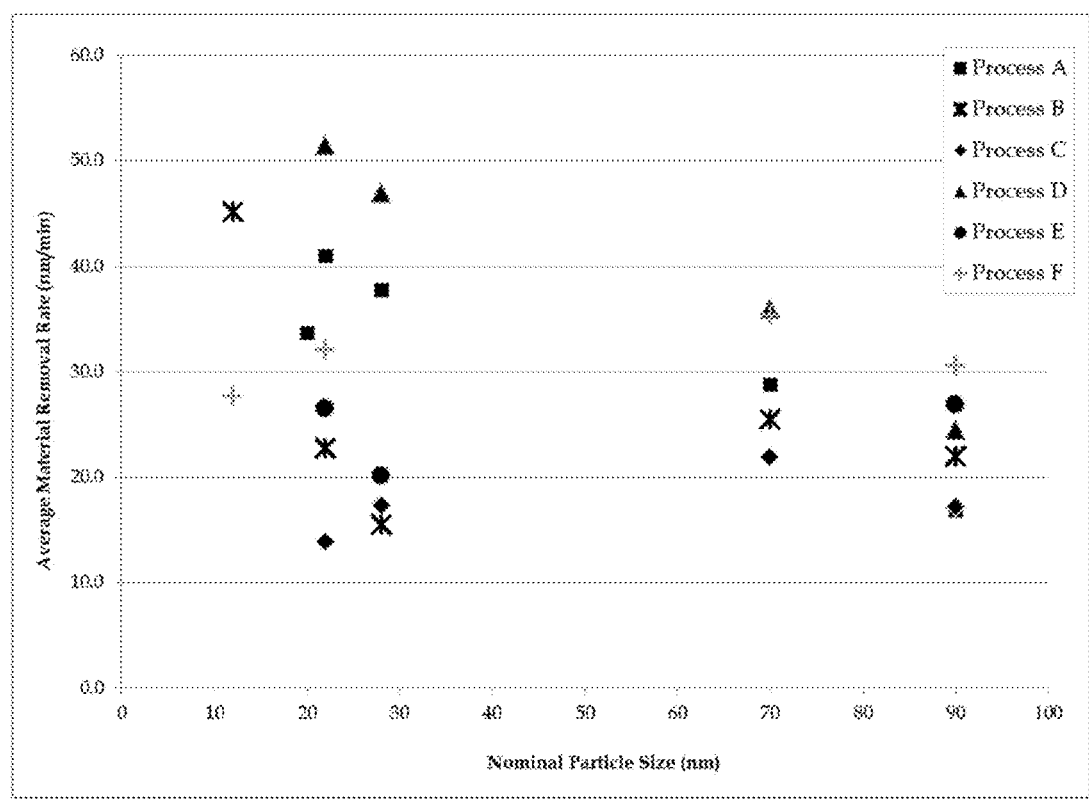
FIG. 4 is a graph of material removal rates from sapphire surfaces for various polishing compositions and polishing pads.

Process A[a]: 12.00 PSI/SUBA ™ 500 Pad-120 minute polish time
Process B: 7.11 PSI/SUBA ™ 600 Pad
Process C: 7.11 PSI/SUBA ™ 800 Pad
Process D: 10.00 PSI/SUBA ™ 500 Pad
Process E: 10.00 PSI/SUBA ™ 600 Pad
Process F: 7.11 PSI/MH Pad The data are also graphically a function of nominal particle size of the colloidal silica abrasive in FIG. 4. The SUBA™ 500 pad, as shown in Process A and D, shows the highest removal rates, with Compositions 2, 3 and 6 all resulting in material removal rates of greater than 45 nm per minute at 10 psi downforce pressure, which are over twice the rates of the larger, unimodal Compositions 4 and 5 under identical polishing conditions. The sapphire removal rates for polishing processes using the SUBA™ 600 or SUBA™ 800 pad are less dependent upon the colloidal silica particle size or PSD, with MRR values of approximately 20+/−5 nm/min, with the exception of Composition 6 used with the SUBA600 pad under Process B, resulting in a material removal rate of greater than 45 nm per minute at 7.11 psi downforce pressure which are over twice the rates of the larger, unimodal Compositions 4 and 5 under identical polishing conditions.

Figure 5:
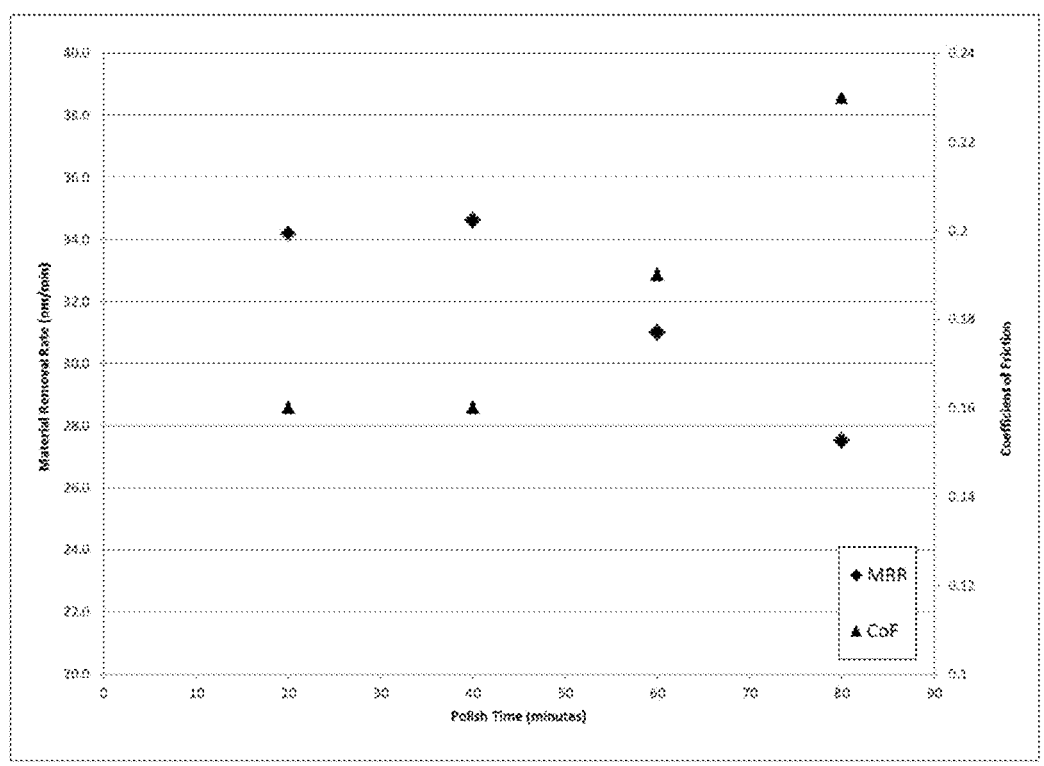
FIG. 5 is graph of incremental material removal rates and coefficient of friction as a function of polishing time.

Polishing in 20 minute increments on the SUBA™ 500 pad at a downforce of 12.0 psi (Process A) can allow one to compare MRRs with 20 minute polishing rates reported in the literature as well as track the planarization progress in terms of removal rate, coefficient of friction, and surface finish. FIG. 5 charts the drop off of MRR with a corresponding increase in the in-situ CoF as a function of polishing time for Composition 5 using Process A. At the initial 20 minute polish period, the MRR for Composition 5 was found to be about 34.2 nm/min, which compares favorably to rates of 25-40 nm/min reported under similar conditions. (See, e.g., U.S. Pat. App. No. 2006/0196849 and Taiwan Pat. App. No. 2007/287484.) However, as polishing progresses, the removal rate drops off as the coefficient of friction increases. This can be understood when considering the smoothing operation. Generally speaking, initially the abrasives are leveling projections off the surface. As the planarization continues, there is increased surface contact between the particles, pad, and wafer surface, resulting in an increase of friction at that interface. However, deep trenches must be removed by removal of a much larger material mass across the entire surface. The drop off in removal rate can be a consequence due to the lack of considerable surface modification as seen in traditional CMP processes. It is important to note the temperature remains relatively stable throughout the 180 minute run times at 24.0 degrees C.+/−2 degrees.

This can be further understood when looking at the corresponding AFM surface plots, discussed in Section C. At 20 minutes of polishing, a surface such as that seen in FIG. 8a is produced. At this point in the polishing process, a 50 um² area reveals the surface has large areas of relative smoothness, yet some particles are adhered to the surface (appearing as "sharp peaks" up to 25 nm in height) and some deeper "saw trenches" still remain, suggesting further planarization of the surface is required. It is notable that the removal rate drops off considerably after 40 minutes of polishing, when the surface contact between wafer, pad and particle has significantly increased during the planarization process.

Figure 6:
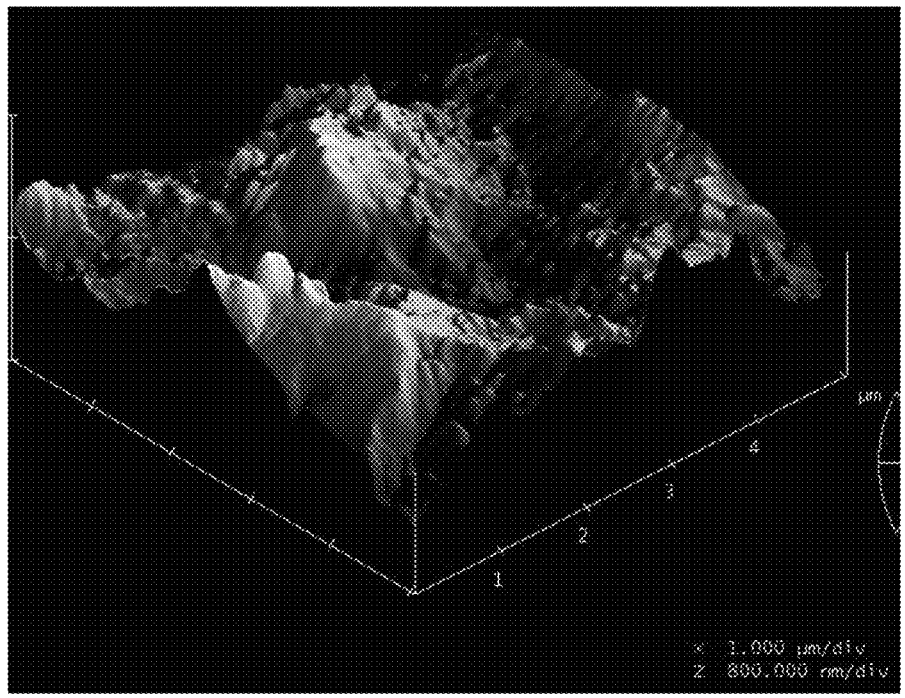
FIG. 6 shows: A) an atomic force microscopy 5 μm×5 μm×800 nm surface plot of a C-plane sapphire wafer surface before polishing; and B) a 20μ×20 μm×2000 nm surface plot of the same wafer.
Figure 6:
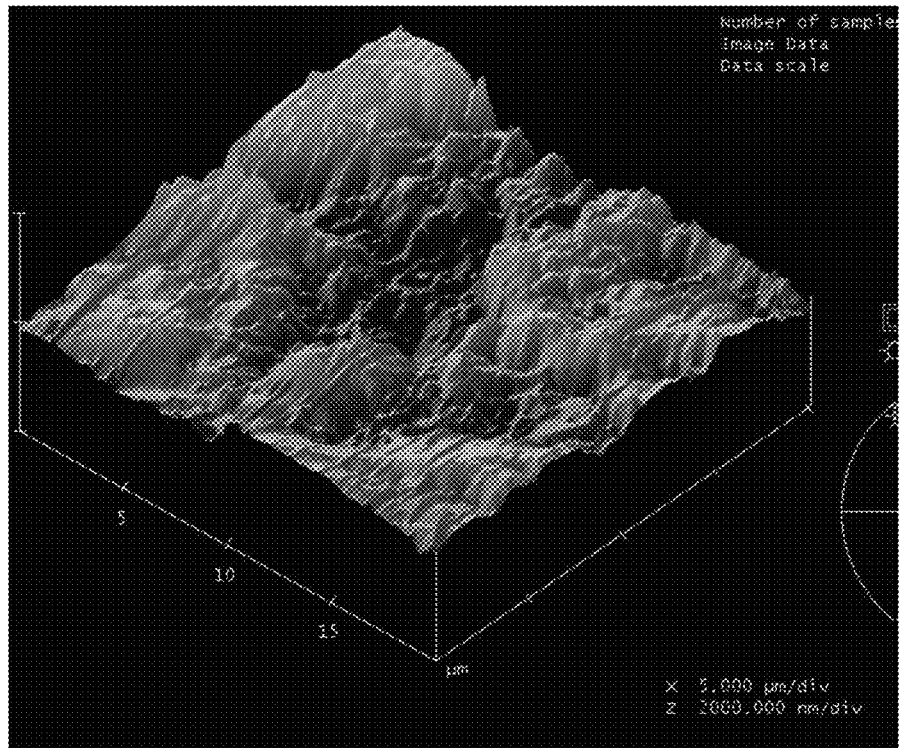
Figure 7:
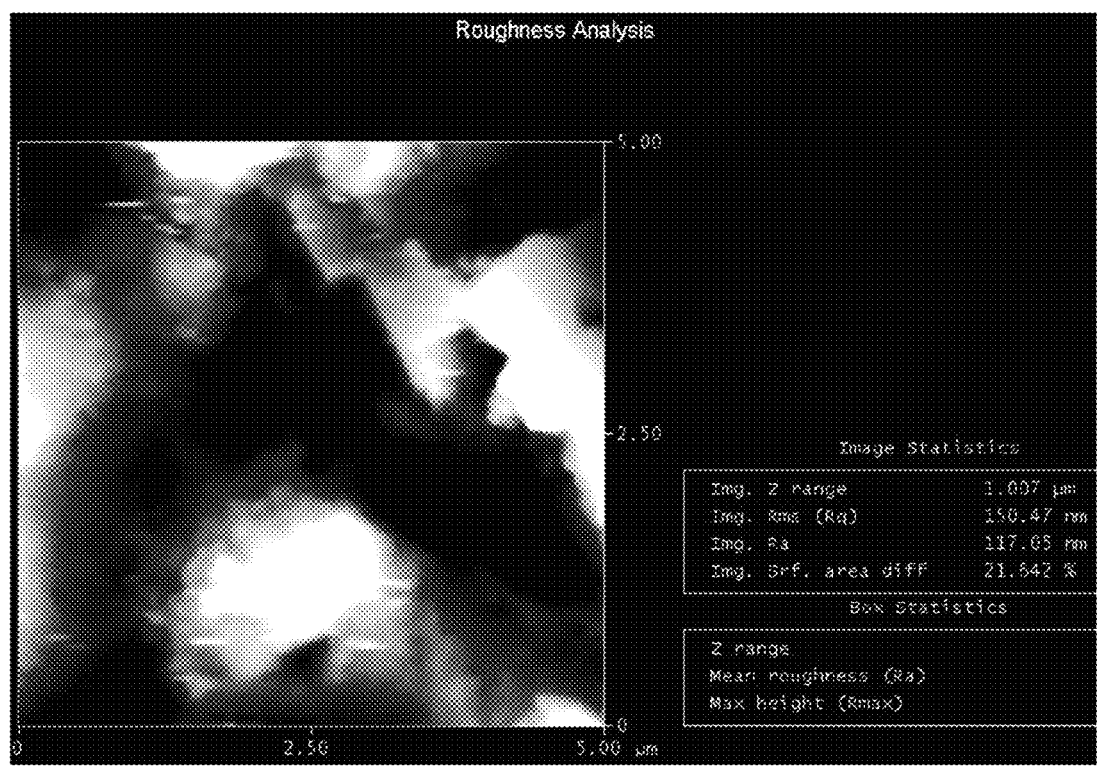
FIG. 7 shows an atomic force microscopy top view image of a C-plane sapphire wafer surface before polishing.

FIG. 6 shows typical surfaces for one of the sapphire wafers examined before polishing: A) 5 μm²×800 nm surface plot of C-plane wafer; RMS=150.5 nm and $R_a$=117.1 nm; B) 20 μm²×2000 nm surface plot of the same wafer, RMS=204.3 nm and an $R_a$=162.6 nm. Large, sharp surface features are evident and the z-scale indicates those features are on the order of hundreds of nanometers in height. A top view of the same 5 μm² location is shown in FIG. 7. The top view indicates relative height of surface features by color shading, with the lowest areas appearing dark and the highest areas being light. The image Z-range for this unpolished surface indicates peaks as high as half a micron (from the lowest point). The roughness for the whole image is $R_a$=117 nm, considerably higher than the eventual goal of subnanometer roughness. Because this is the surface of the wafer after slicing (sawing) from the sapphire core, saw marks are the likely cause of the morphology seen in FIGS. 6 and 7.

Figure 8:
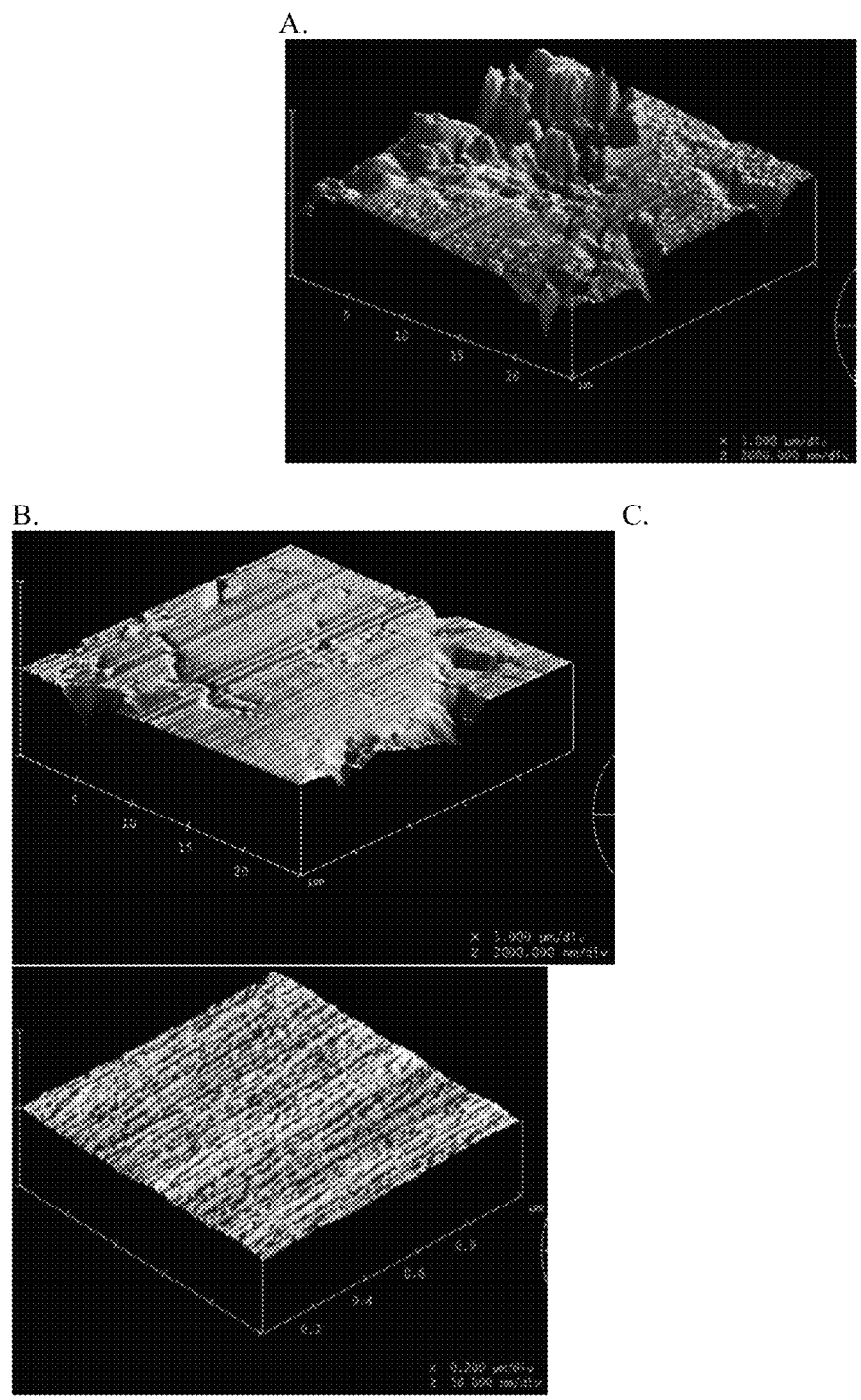
FIG. 8 shows AFM surface plots of C-plane sapphire wafer surfaces during polishing with a colloidal silica Composition 5: A) 20 minutes, 25 μm×25 μm×2000 nm surface plot; B) 120 minutes, 25 μm×25 μm×2000 nm surface plot; and C) 120 minutes, 1 μm×1 μm×50 nm surface plot.
Figure 9:
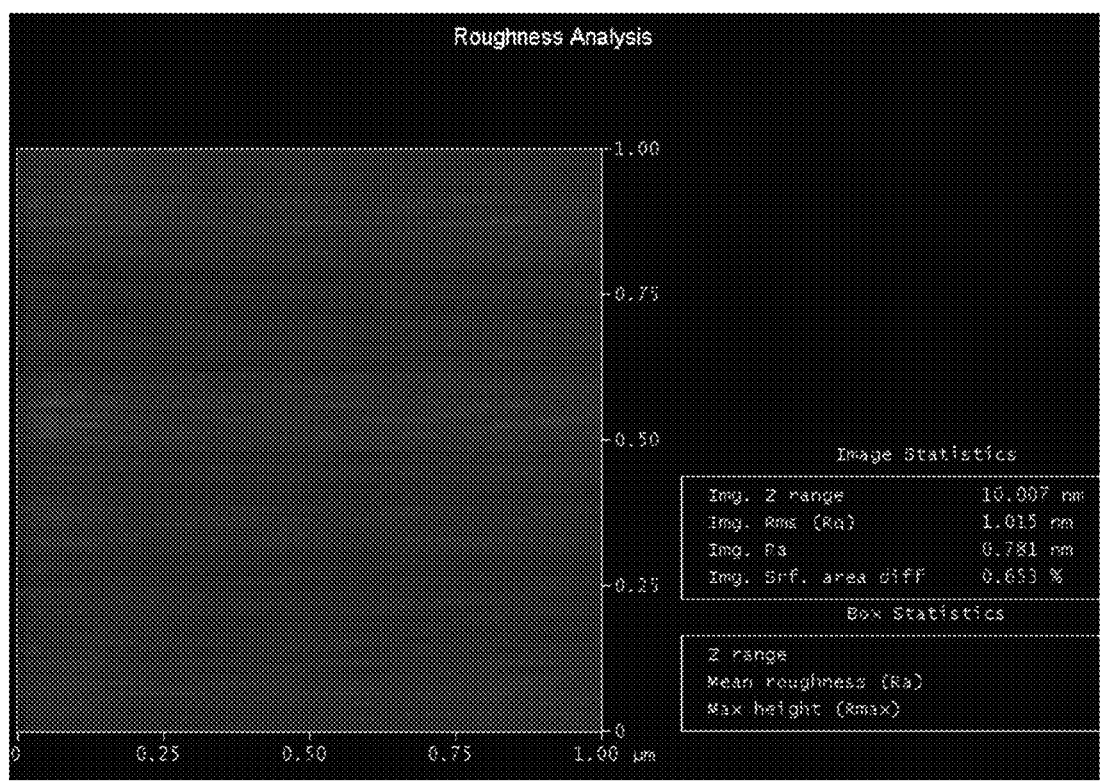
FIG. 9 shows an atomic force microscopy top view image of a C-plane sapphire wafer surface after polishing with Composition 2 under Process A conditions.

Polishing for a period of 2 hours on the SUBA 500 pad at a downforce of 12.0 psi (Process A) can produce a surface such as that seen in FIGS. 8 and 9. FIG. 8 shows AFM surface plots of C-plane sapphire during polishing Process A with Composition 5. A) at 20 minutes polish time: 25 μm²×2000 nm surface plot; RMS=350 nm; B) at 120 minutes 25 μm²× 2000 nm surface plot; RMS=70 nm; and C) 1 μm²×50 nm surface plot; RMS=4.30 nm and Ra=3.50 nm. FIG. 9 shows an AFM top view (1 um×1 um) and roughness statistics of c-plane sapphire wafers after polishing Process A using Composition 2.

At this point in the polishing process, a 50 um² area reveals the surface has large areas of relative smoothness, yet some particles are adhered to the surface and some deeper "saw trenches" still remain, suggesting further cleaning and planarization of the surface is required. The removal rate drops off as the degree of smoothness increases and surface interactions increase. At 120 minutes, there are large areas of relative planarity, and isolation of 1 to 10 μm² areas are ideal to capture surface fine features while also providing a representative roughness evaluation for the entire wafer. In the 1

μm² image of FIG. 8c, only small grooves on the order of <10 nm in depth are observed and the area appears homogeneous with a nanometer surface roughness.

However, targets of sub-nanometer roughness imply longer polishing times are needed to reach final surface roughness targets. For this reason, all other polishing runs were extended to 180 minutes, as tabulated in Table 6. With the additional 60 minutes of polish time at the removal rates identified in Section B, all silica slurries were calculated to meet the sapphire removal depth required for the surface smoothness targets, barring destructive polishing, or gouging. As seen from the tabulated results, the downforce pressure of 7.11 psi was insufficient to meet the surface finish targets for the silica sols with the smaller nominal particle sizes, regardless of SUBA pad used.

TABLE 6

| Composition | Process A | | Process B | | Process C | |
|---|---|---|---|---|---|---|
| | RMS | Ra | RMS | Ra | RMS | Ra |
| 2 | 1.010 | 0.781 | 3.26 | 1.5 | 0.549 | 0.262 |
| 3 | 1.200 | 1.100 | 1.99 | 0.903 | 3.33 | 2.19 |
| 4 | 8.440 | 7.100 | 0.638 | 0.345 | 0.732 | 0.444 |
| 5 | 4.300 | 3.500 | 0.634 | 0.357 | 0.760 | 0.520 |
| 6 | | | 0.115 | 0.091 | | |

| Composition | Process D | | Process E | | Process F | |
|---|---|---|---|---|---|---|
| | RMS | Ra | RMS | Ra | RMS | Ra |
| 2 | 0.285 | 0.285 | 0.323 | 0.219 | 0.187 | 0.153 |
| 3 | 0.489 | 0.489 | 0.346 | 0.223 | | |
| 4 | 0.800 | 0.800 | | | 0.247 | 0.185 |
| 5 | 0.765 | 0.765 | 0.570 | 0.304 | 0.280 | 0.233 |
| 6 | 0.292 | 0.229 | | | 0.656 | 0.508 |

Figure 10:
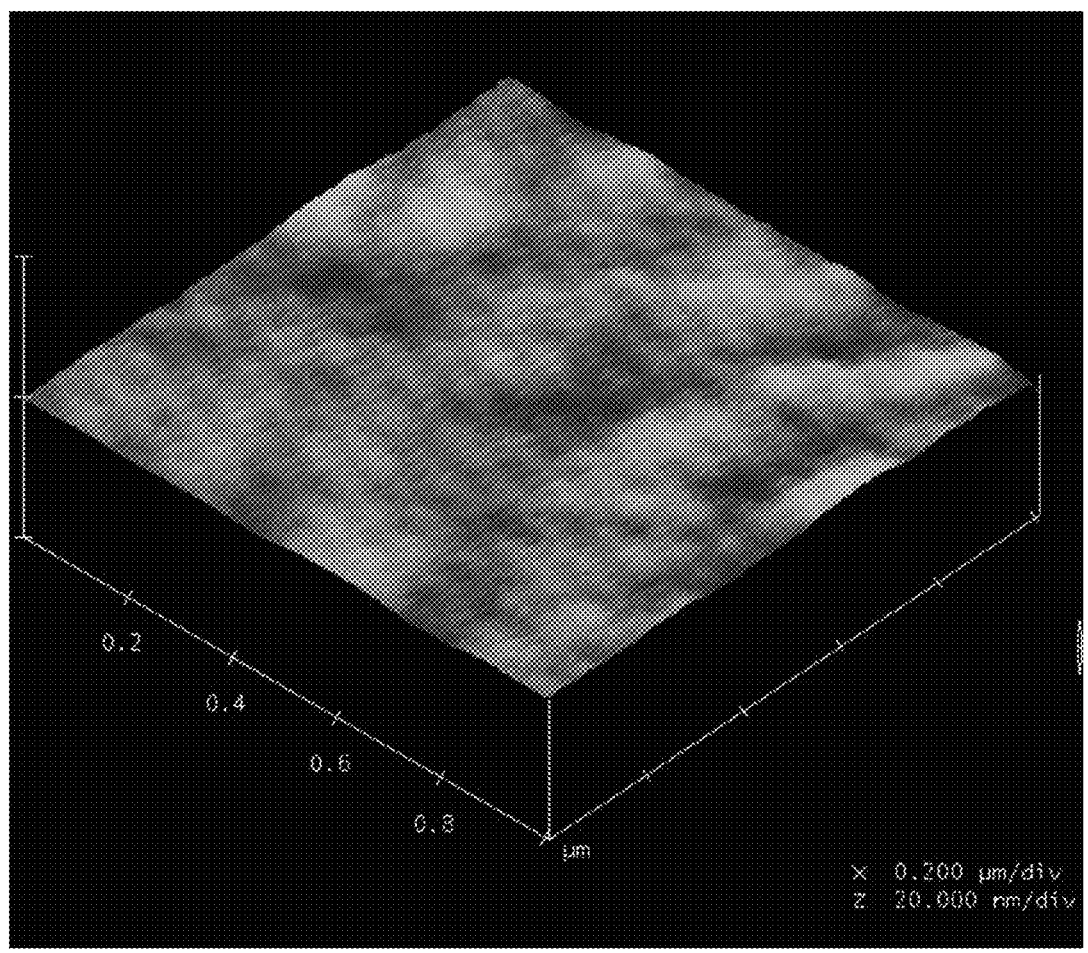
FIG. 10 shows an atomic force microscopy 1 μm×1 μm×20 nm surface plot of C-plane wafer after 180 minute polish using Composition 2 under Process D conditions.
Figure 11:
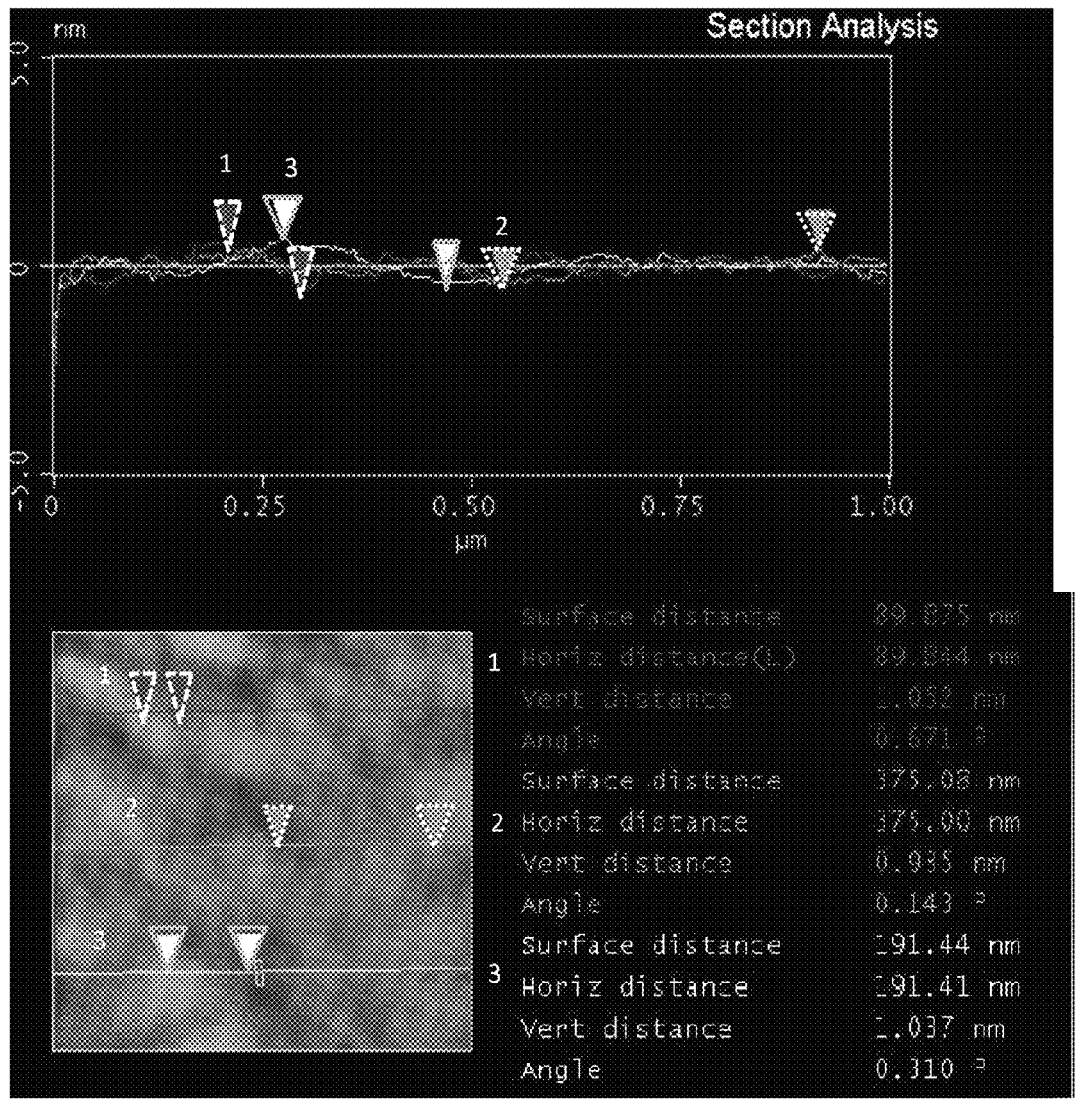
FIG. 11 shows a cross-section of the polished wafer shown in FIG. 10, indicating variability across the surface.
Figure 12:
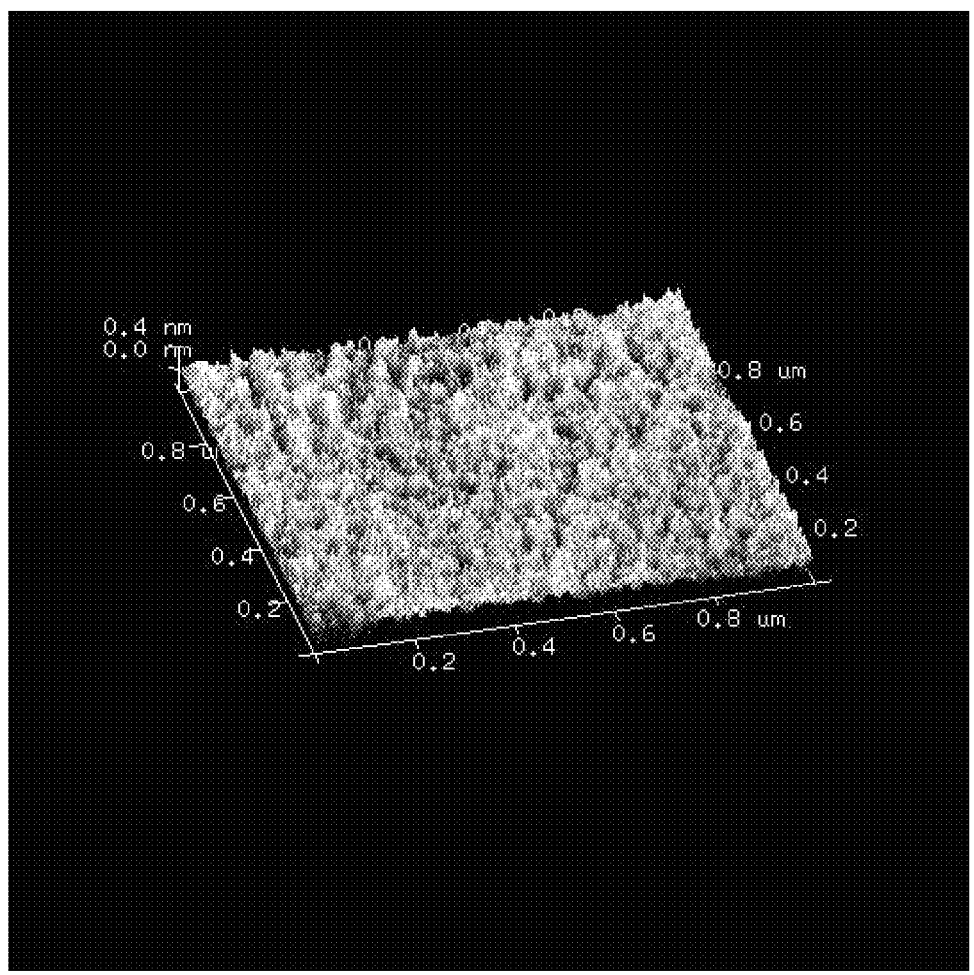
FIG. 12 shows an atomic force microscopy 1 μm×1 μm×20 nm surface plot of C-plane wafer after 180 minute polish using Composition 6 under Process B conditions.
Figure 13:
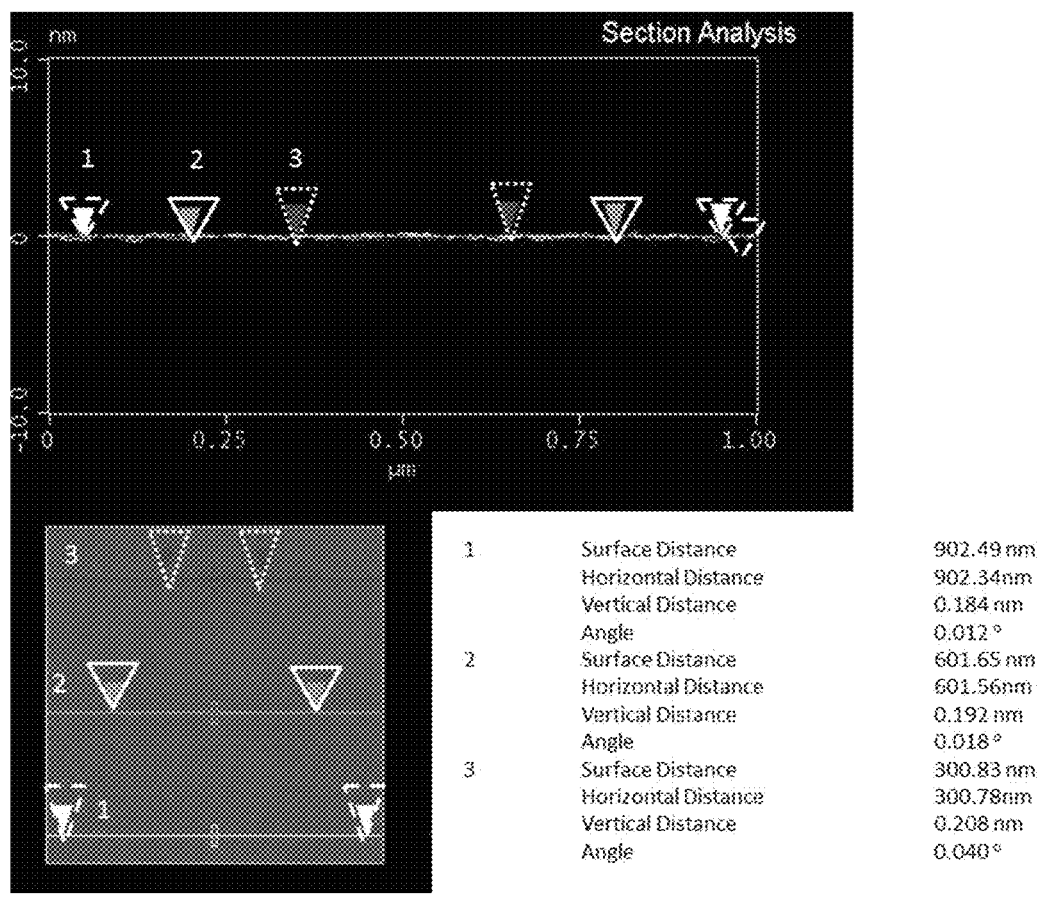
FIG. 13 shows a cross-section of the polished wafer shown in FIG. 12, indicating variability across the surface.
Figure 14:
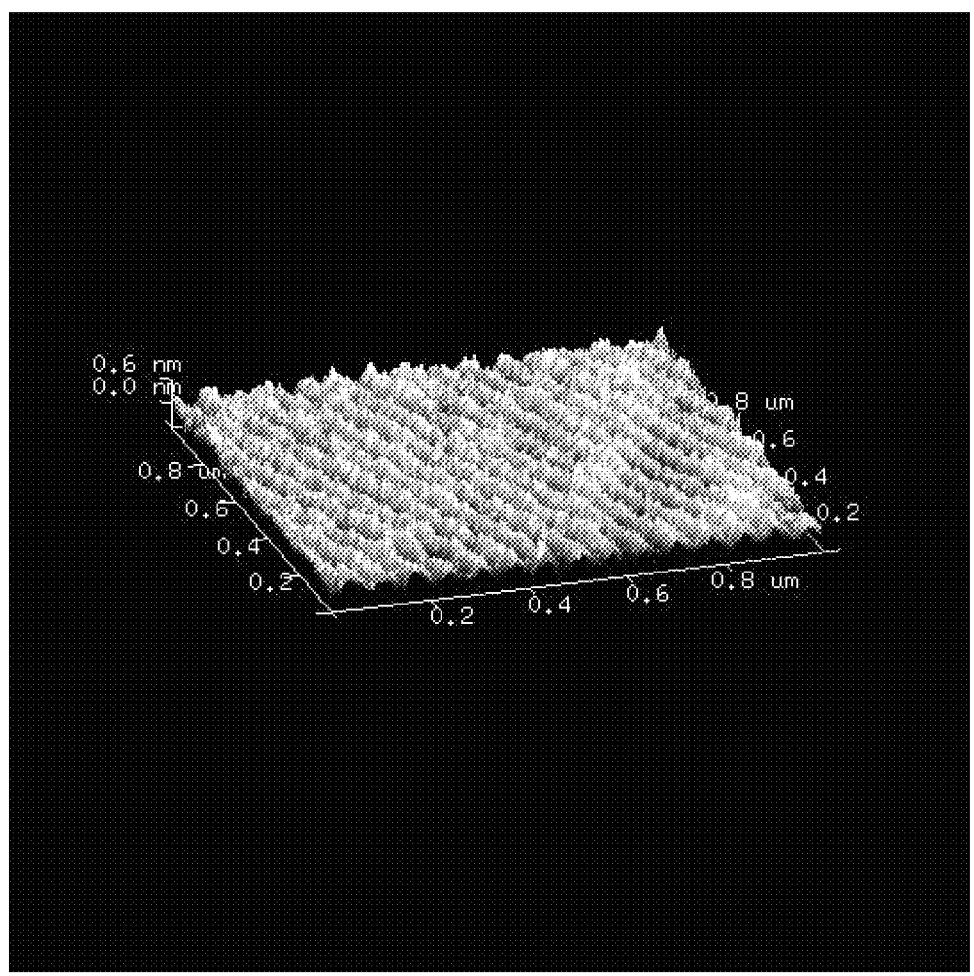
FIG. 14 shows an atomic force microscopy 1 μm×1 μm×20 nm surface plot of C-plane wafer after 180 minute polish using Composition 2 under Process F conditions.
Figure 15:
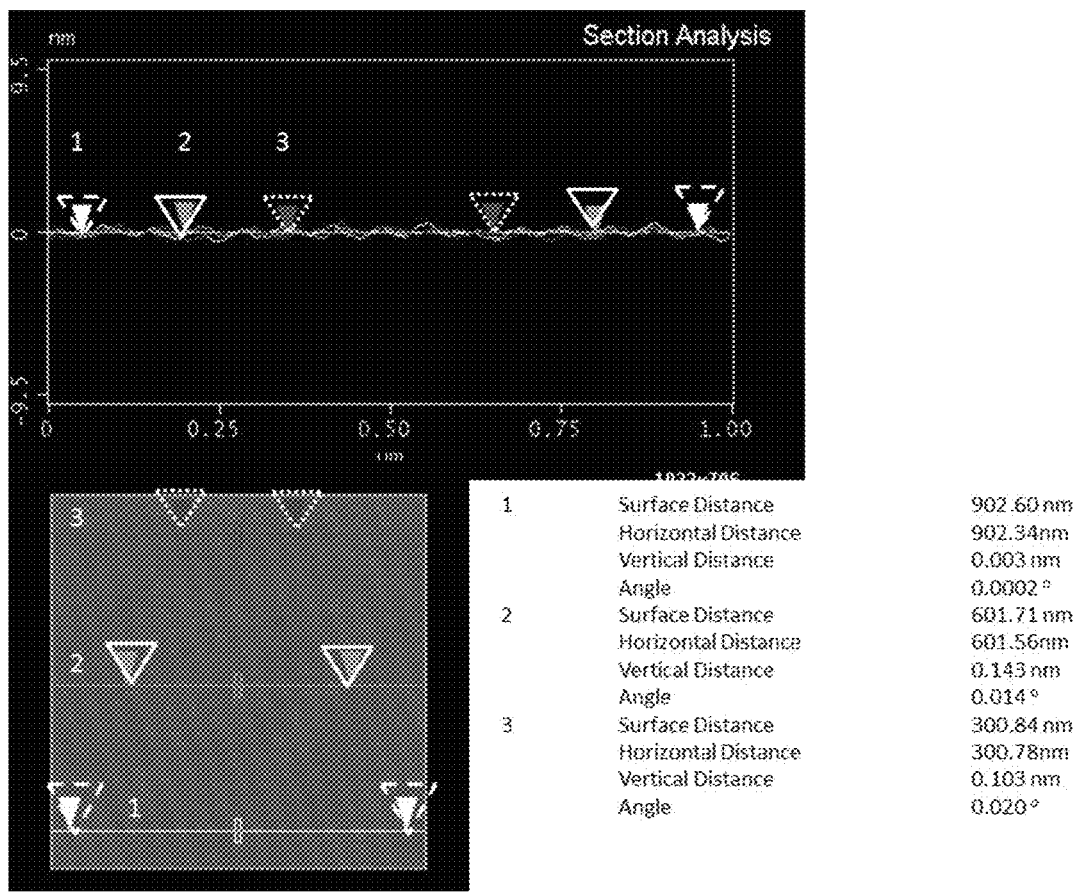
FIG. 15 shows a cross-section of the polished wafer shown in FIG. 14, indicating variability across the surface.
Figure 16:
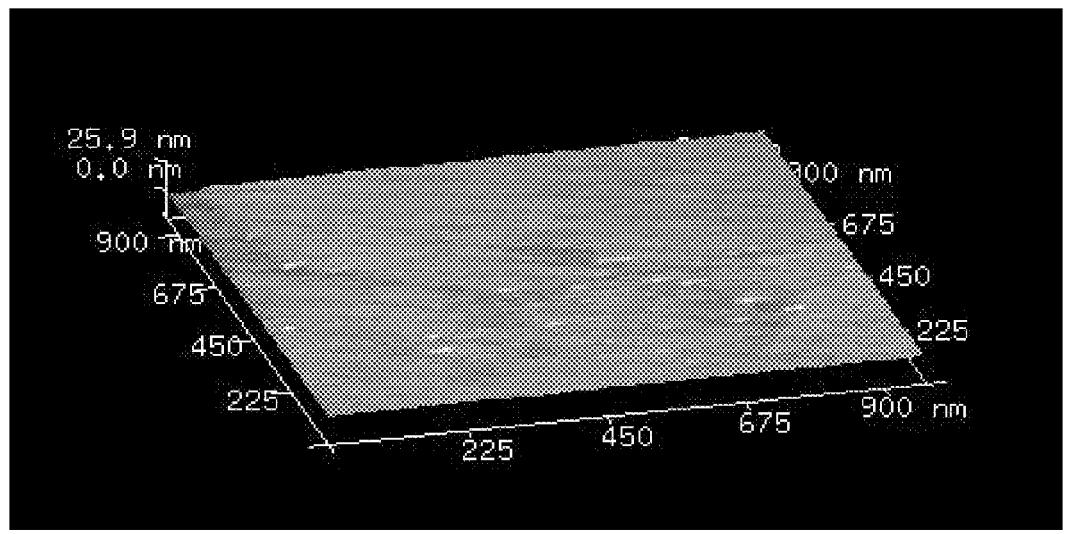
FIG. 16 shows an atomic force microscopy 1 μm×1 μm×20 nm surface plot of C-plane wafer after 180 minute polish using Composition 6 under Process F conditions.
Figure 17:
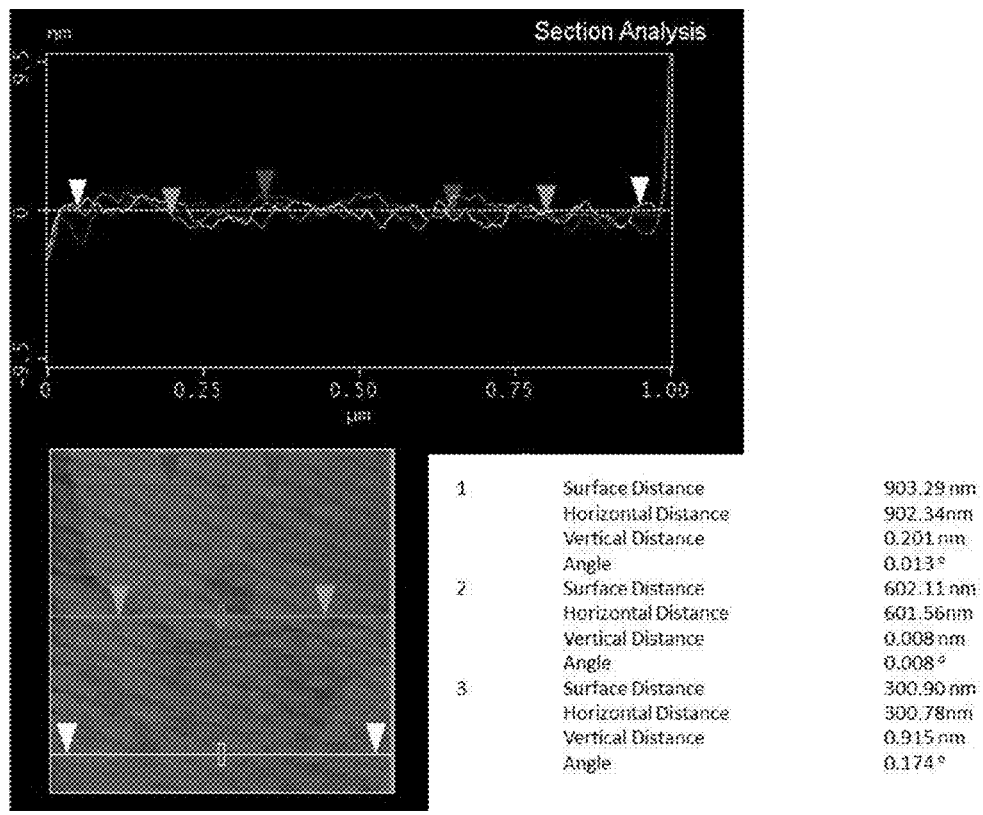
FIG. 17 shows a cross-section of the polished wafer shown in FIG. 16, indicating variability across the surface.
Figure 18:
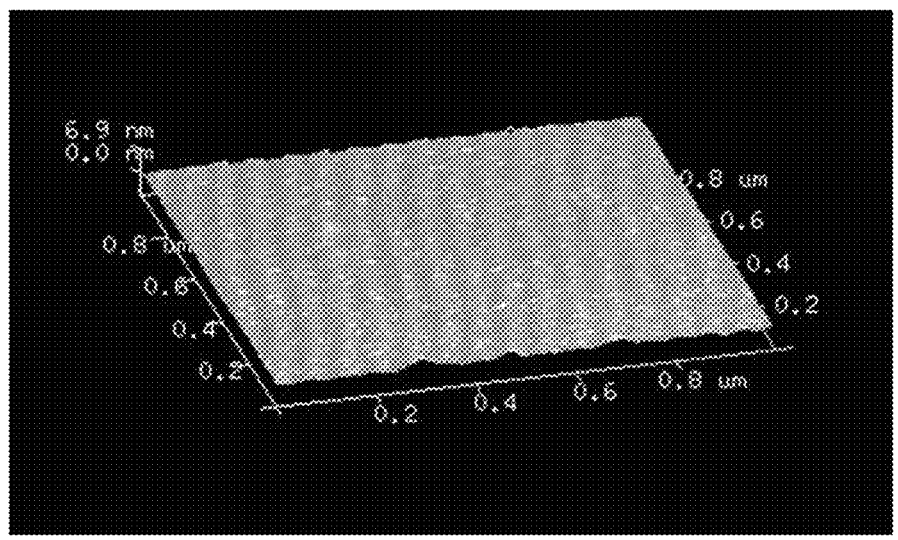
FIG. 18 shows an atomic force microscopy 1 μm×1 μm×20 nm surface plot of R-plane wafer after 180 minute polish using Composition 6 under Process D conditions.
Figure 19:
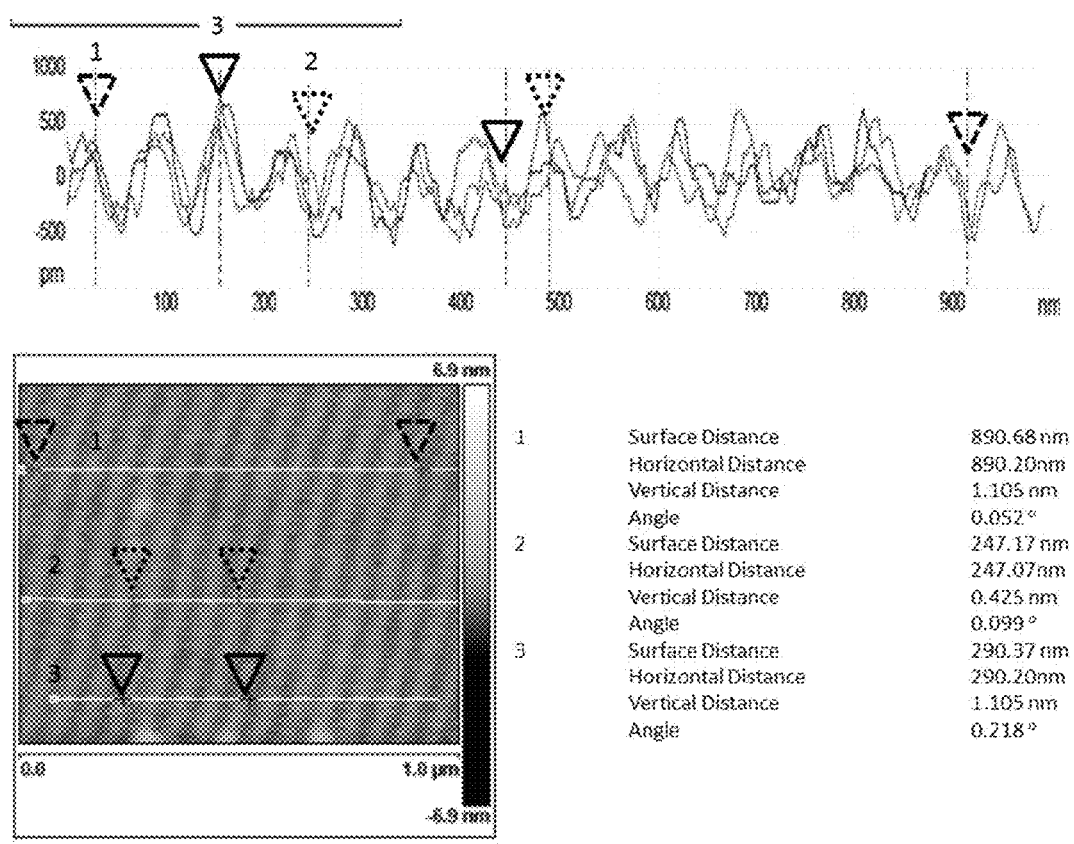
FIG. 19 shows a cross-section of the polished wafer shown in FIG. 18, indicating variability across the surface.

The 180 minute polish runs were able to more consistently produce the sub-nanometer surface roughness. FIG. 10 shows a C-plane wafer surface after polishing for 180 minutes under Process D conditions, and indicates that sub-nanometer average roughness was achieved. FIG. 11 shows a cross-section of the same wafer, indicating the variability across the surface. FIG. 12 shows a C-plane wafer surface after polishing for 180 minutes using Composition 6 under Process B conditions, and FIG. 13 shows a cross-section of the same wafer, indicating variability across the surface. FIG. 14 shows a C-plane wafer surface after polishing for 180 minutes using Composition 2 under Process F conditions, and FIG. 15 shows a cross-section of the same wafer, indicating variability across the surface. FIG. 16 shows a C-plane wafer surface after polishing for 180 minutes using Composition 6 under Process F conditions, and FIG. 17 shows a cross-section of the same wafer, indicating variability across the surface. FIG. 18 shows an R-plane wafer surface after polishing for 180 minutes using Composition 6 under Process D conditions, and FIG. 19 shows a cross-section of the same wafer, indicating variability across the surface.

The best performance was obtained for Composition 6 achieving an RMS of 115 Angstroms and an Ra of 0.9 Angstroms under Process B, followed Composition 2 under Process D achieving an RMS of 2.85 Angstroms and an Ra of 2.03 Angstroms, followed by Composition 3 under Process D achieving an RMS of 4.89 Angstroms and an Ra of 3.73 Angstroms. These compositions also achieved the highest removal rates as reported in Section B, with MRR values of 45.2, 51.5 and 47.0 nm/min., respectively. R-plane sapphire wafers may be polished under the same conditions as C-plane wafers with similar trends observed. For example, R-plane wafers polished for 3 hours using Composition 4 at 40% solids under Process D results in a material removal rate of 43.5 micron/minute, achieving an RMS of 2.64 Angstroms and an Ra of 2.1 Angstroms. R-plane wafers polished for 3 hours using Composition 6 at 40% solids under Process D results in a material removal rate of 40.6 micron/minute, achieving an RMS of 2.92 Angstroms and an Ra of 2.3 Angstroms.

The invention claimed is:

1. A method of polishing a sapphire surface, comprising: abrading a sapphire surface with a rotating polishing pad and a polishing composition, wherein the polishing composition comprises an effective amount of colloidal silica, wherein the colloidal silica has a broad particle size distribution, and wherein the ratio of the standard deviation of the particle size of the colloidal silica ($\sigma$), to the mean particle size of the colloidal silica (r), is at least about 0.3.

2. The method of claim 1, wherein the colloidal silica comprises about 1 wt. % to about 50 wt. % of the polishing composition.

3. The method of claim 1, wherein the colloidal silica has a particle size distribution of about 5 nm to about 120 nm.

4. The method of claim 1, wherein the ratio $\sigma/r$ is from about 0.3 to about 0.9.

5. The method of claim 1, wherein the colloidal silica composition has a mean particle size of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm and each size is 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, or 25.0% of the total mass of the colloidal silica particles used in the polishing composition.

6. The method of claim 1, wherein the colloidal silica has a mean particle size of about 5 nm to about 50 nm.

7. The method of claim 1, wherein the polishing composition further comprises an additional component selected from the group consisting of an alkaline substance, inorganic polishing particles, a water-soluble alcohol, a chelating agent and a buffering agent.

8. The method of claim 1, wherein the pH of the polishing composition is about 6 to about 10.5.

9. The method of claim 1, wherein the polishing pad is applied to the sapphire surface with a downforce of about 5 psi to about 25 psi.

10. The method of claim 1, wherein the polishing pad is rotated at a rate of about 40 rpm to about 120 rpm.

11. The method of claim 1, wherein the polishing pad comprises a polyurethane impregnated polyester material.

12. The method of claim 11, wherein the polishing pad has a compressibility of about 1% to about 40%.

13. The method of claim 1, wherein the polishing pad has a Shore D hardness of about 50 to about 60.

14. The method of claim 1, wherein the sapphire surface is a sapphire C-plane surface.

15. The method of claim 1, wherein the sapphire surface is a sapphire R-plane surface.

16. The method of claim 1, wherein the colloidal silica is prepared by a process comprising:
(a) feeding a first component including preformed silica sol particles of predetermined minimum particle size to at least one agitated, heated reactor;

(b) adding a second component including silicic acid to said reactor, wherein the second component is fed to the reactor at a rate that is less than a new silica particle nucleation rate;

(c) adding a third component including an alkaline agent to the reactor; and (d) wherein the minimum particle size of the resulting colloidal silica is controlled by the particle size of the first component, and wherein the broad particle size distribution is dependent on the ratio of the feed rate of the first component to the reactor to the feed rate of the second component to the reactor.

17. The method of claim 1, wherein the colloidal silica is prepared by a process comprising blending two or more colloidal silica compositions, wherein the colloidal silica compositions have an average particle size of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 nm.

18. A method of polishing a sapphire surface, comprising: abrading a sapphire surface with a rotating polishing pad and a polishing composition, wherein the polishing composition comprises an effective amount of colloidal silica, wherein the colloidal silica has a broad particle size distribution, and wherein the colloidal silica is prepared by a process comprising blending two or more colloidal silica compositions, wherein the colloidal silica compositions have an average particle size of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 nm.

* * * * *